United States Patent
Nakata et al.

(10) Patent No.: US 8,098,648 B2
(45) Date of Patent: Jan. 17, 2012

(54) LOAD DISTRIBUTING METHOD

(75) Inventors: Tsuneo Nakata, Tokyo (JP); Yuusuke Noguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 914 days.

(21) Appl. No.: 10/526,958

(22) PCT Filed: Jan. 7, 2005

(86) PCT No.: PCT/JP2005/000139
§ 371 (c)(1),
(2), (4) Date: Sep. 16, 2006

(87) PCT Pub. No.: WO2005/067227
PCT Pub. Date: Jul. 21, 2005

(65) Prior Publication Data
US 2007/0002748 A1    Jan. 4, 2007

(30) Foreign Application Priority Data

| Jan. 9, 2004 | (JP) | 2004-004545 |
| Sep. 7, 2004 | (JP) | 2004-260245 |
| Jan. 5, 2005 | (JP) | 2005-000997 |

(51) Int. Cl.
*H04L 12/28* (2006.01)

(52) U.S. Cl. ........ 370/351; 370/254; 370/396; 370/400; 370/256; 370/410; 709/238; 709/239; 709/240; 709/241; 709/242

(58) Field of Classification Search ............. 370/254, 370/392, 396, 397, 351, 255, 400, 401, 410, 370/238, 256, 395; 709/238, 239, 240, 241, 709/242
See application file for complete search history.

(56) References Cited

U.S. PATENT DOCUMENTS

| 5,247,464 | A | * | 9/1993 | Curtis | 379/25 |
| 5,359,593 | A | * | 10/1994 | Derby et al. | 370/234 |
| 5,582,860 | A | * | 12/1996 | Fontana et al. | 427/130 |
| 5,583,860 | A | * | 12/1996 | Iwakawa et al. | 370/232 |
| 5,687,167 | A | * | 11/1997 | Bertin et al. | 370/254 |
| 5,878,026 | A | * | 3/1999 | Greenberg et al. | 370/230 |

(Continued)

FOREIGN PATENT DOCUMENTS
JP    58-027449    2/1983
(Continued)

OTHER PUBLICATIONS

Ogier, Richard G. et al.; "Minimum-Expected-Delay Alternative Routing"; Proceedings of the Conference on Computer Communications, INFOCOM '92, vol. Conf. 11, May 4, 1992, pp. 617-625.

(Continued)

*Primary Examiner* — Ayaz Sheikh
*Assistant Examiner* — Andrew C Lee
(74) *Attorney, Agent, or Firm* — Dickstein Shapiro LLP

(57) ABSTRACT

When path status information is updated, the time at which the update is effective is recorded. A packet arrival time in each path is predicted based on new status information and data transmission history after the effective time. The packet is transmitted to the path that provides a fastest packet arrival time. This reflects the path status available from the reception side on the data transmitted in past, so that an actual data arrival time, an arrival time close to a reception completion time, or a reception completion time can be predicted.

35 Claims, 15 Drawing Sheets

U.S. PATENT DOCUMENTS

| | | | | |
|---|---|---|---|---|
| 5,926,463 | A * | 7/1999 | Ahearn et al. | 370/254 |
| 5,940,372 | A * | 8/1999 | Bertin et al. | 370/238 |
| 6,058,102 | A * | 5/2000 | Drysdale et al. | 370/252 |
| 6,208,643 | B1 * | 3/2001 | Dieterich et al. | 370/389 |
| 6,301,244 | B1 | 10/2001 | Huang et al. | |
| 6,347,091 | B1 * | 2/2002 | Wallentin et al. | 370/437 |
| 6,370,560 | B1 * | 4/2002 | Robertazzi et al. | 718/105 |
| 6,400,681 | B1 * | 6/2002 | Bertin et al. | 370/218 |
| 6,414,971 | B1 * | 7/2002 | James et al. | 370/519 |
| 6,430,160 | B1 * | 8/2002 | Smith et al. | 370/252 |
| 6,542,468 | B1 * | 4/2003 | Hatakeyama | 370/238 |
| 6,580,694 | B1 * | 6/2003 | Baker | 370/252 |
| 6,674,726 | B1 * | 1/2004 | Kado et al. | 370/253 |
| 6,707,821 | B1 * | 3/2004 | Shaffer et al. | 370/395.4 |
| 6,741,569 | B1 * | 5/2004 | Clark | 370/252 |
| 6,757,255 | B1 * | 6/2004 | Aoki et al. | 370/252 |
| 6,765,873 | B1 * | 7/2004 | Fichou et al. | 370/235 |
| 6,820,134 | B1 * | 11/2004 | Zinin et al. | 709/238 |
| 6,850,498 | B2 * | 2/2005 | Heath et al. | 370/328 |
| 6,859,842 | B1 * | 2/2005 | Nakamichi et al. | 709/238 |
| 6,865,160 | B1 * | 3/2005 | Bare | 370/256 |
| 6,940,831 | B1 * | 9/2005 | Omi et al. | 370/310.1 |
| 6,958,977 | B1 * | 10/2005 | Mitrani et al. | 370/252 |
| 6,985,501 | B2 * | 1/2006 | Suzuki et al. | 370/517 |
| 7,012,890 | B2 * | 3/2006 | Yazaki et al. | 370/229 |
| 7,012,893 | B2 * | 3/2006 | Bahadiroglu | 370/231 |
| 7,079,493 | B2 * | 7/2006 | Nakamichi et al. | 370/252 |
| 7,082,124 | B1 * | 7/2006 | Katukam | 370/357 |
| 7,111,074 | B2 * | 9/2006 | Basturk | 709/241 |
| 7,206,861 | B1 * | 4/2007 | Callon | 709/242 |
| 7,240,364 | B1 * | 7/2007 | Branscomb et al. | 726/9 |
| 7,296,083 | B2 * | 11/2007 | Barham et al. | 709/232 |
| 7,336,618 | B2 * | 2/2008 | Bennett | 370/252 |
| 7,372,819 | B2 * | 5/2008 | Martin | 370/252 |
| 7,376,731 | B2 * | 5/2008 | Khan et al. | 709/224 |
| 7,457,868 | B1 * | 11/2008 | Guo | 709/224 |
| 7,474,674 | B2 * | 1/2009 | Yamaguchi et al. | 370/468 |
| 7,508,769 | B1 * | 3/2009 | Duffield et al. | 370/252 |
| 7,539,142 | B1 * | 5/2009 | Gurley et al. | 370/235 |
| 7,539,175 | B2 * | 5/2009 | White et al. | 370/350 |
| 7,660,241 | B2 * | 2/2010 | Sridhar et al. | 370/229 |
| 7,660,269 | B2 * | 2/2010 | Aoki et al. | 370/255 |
| 7,765,321 | B2 * | 7/2010 | Twata et al. | 709/238 |
| 2002/0053029 | A1 * | 5/2002 | Nakamura et al. | 713/201 |
| 2002/0071391 | A1 | 6/2002 | Ishioka | |
| 2004/0073655 | A1 * | 4/2004 | Kan et al. | 709/224 |
| 2004/0193728 | A1 * | 9/2004 | Doshi et al. | 709/238 |
| 2006/0018321 | A1 * | 1/2006 | Yamada et al. | 370/392 |

FOREIGN PATENT DOCUMENTS

| | | |
|---|---|---|
| JP | 2000-049862 A | 2/2000 |
| JP | 2000-216815 A | 8/2000 |
| JP | 2001-308917 A | 11/2001 |
| JP | 2001-333100 A | 11/2001 |
| JP | 2002-176441 A | 6/2002 |
| JP | 2003-188907 A | 7/2003 |
| WO | WO-02/096021 A2 | 11/2002 |

OTHER PUBLICATIONS

Funk, James, C. et al.;"Inverse Multiplexing in Short-Range Multi-Transport Wireless Communications"; WCNC 2003—IEEE Wireless Communications and Networking Conference, New Orleans, LA, vol. 2, Mar. 16, 2003, pp. 757-762.

Gallager, Robert G.; "A Minimum Delay Routing Algorithm Using Distributed Computation"; IEEE Transactions on Communications, vol. 25, No. 1, Jan. 1, 1977, pp. 73-85.

* cited by examiner

PATH CONTROL TABLE        1321

| DESTINATION NETWORK IP ADDRESS | NETWORK MASK | GATEWAY IP ADDRESS | COMMUNICATIONS INTERFACE | |
|---|---|---|---|---|
| 200.7.8.9 | 255.255.255.255 | 100.1.2.4 | S-IF#1 | 1321-a |
| 200.7.8.9 | 255.255.255.255 | 110.1.2.5 | S-IF#2 | 1321-b |
| 200.7.8.9 | 255.255.255.255 | 120.1.2.4 | S-IF#3 | 1321-c |
| 192.168.3.50 | 255.255.255.0 | 192.168.3.49 | S-IF#4 | 1321-d |

IF ADDRESS MANAGEMENT TABLE

| COMMUNICATIONS INTERFACE | ALLOCATION IP ADDRESS |
|---|---|
| S-IF#1 | 100.1.2.3 |
| S-IF#2 | 110.1.2.3 |
| S-IF#3 | 120.1.2.3 |
| S-IF#4 | 192.168.3.254 |

FIG. 14

PATH TO COMMUNICATIONS INTERFACE CORRESPONDENCE TABLE 1330

| COMMUNICATION PATH NUMBER | COMMUNICATIONS INTERFACE |
|---|---|
| 1 | S-IF#1 |
| 2 | S-IF#3 |
| 3 | S-IF#2 |

FIG. 15

TRANSMISSION IP PACKET CREATION DATA 1510

| DESTINATION IP ADDRESS (200.7.8.9) | TRANSMISSION SOURCE IP ADDRESS (110.1.2.3) | TRANSMISSION DATA |
|---|---|---|

FIG. 16

DELIVERY IP PACKET 1610

| IP HEADER | | | TRANSMISSION DATA |
|---|---|---|---|
| TRANSMISSION SOURCE IP ADDRESS (110.1.2.3) | DESTINATION IP ADDRESS (200.7.8.9) | OTHER IP HEADER INFORMATION | |

OTHER MODE OF TRANSMISSION IP PACKET CREATION DATA

OTHER MODE OF DELIVERY IP PACKET

FIG. 21

PATH CONTROL TABLE  1321

| DESTINATION NETWORK IP ADDRESS | NETWORK MASK | GATEWAY IP ADDRESS | COMMUNICATIONS INTERFACE | |
|---|---|---|---|---|
| 200.7.8.9 | 255.255.255.255 | 100.1.2.4 | S-IF#1 | 1321-a |
| 200.7.8.9 | 255.255.255.255 | 110.1.2.5 | S-IF#2 | 1321-b |
| 200.7.8.9 | 255.255.255.255 | 120.1.2.4 | S-IF#3 | 1321-c |

LOAD DISTRIBUTING METHOD

TECHNICAL FIELD

The present invention relates to a communication system between two nodes usable plural communication paths. Particularly, the present invention relates to a technique of distributing the load between paths by a transmission node.

BACKGROUND OF THE RELATED ART

In plural paths between two nodes, the transmission side dispersively inputs traffics to respective paths and the reception side reintegrates them from the respective paths. Thus, a higher transfer rate can be obtained in principle, compared with the case where a single path is used. This mechanism relates to a technique of combining paths to construct one logical path. Typically, Inverse Multiplexing is cited, which is utilized to obtain a logical broad band line from plural low rate links. As applications to data communications, there are multiplexing of ATM line and Multilink PPP being a multiplex protocol for PPP links.

As a traffic distribution scheme, typified by Inverse Multiplexing, of forming one logical path by combining paths, the round robin scheme, for example, of transmitting packets or fragments in turn to respective paths has been broadly used (refer to non-Patent document 1). This method is effective when the rate (or speed) in each path is nearly the same and constant. However, the problem is that when the rates between paths are in imbalance, the transfer rate between nodes is rate-controlled to the slowest path.

In order to deal with such a problem, the weighted round robin is known for controlling the use frequency of each path according to the rate. The round robin is installed to router products corresponding to the technique of combining paths to form one logical path. The product manufactured by Cisco employs the method of implementing optimum load distribution by hashing input packets to determine the output path. These sets of information are described in the documents published by companies (for example, non-Patent document 2).

Any one of the above-mentioned well-known techniques assumes that each path consists of a cable link only.

As to the technique, which combines paths to construct one logical path, the path containing a radio link is proposed. In this proposed scheme, the input packet is divided into fragments to allocate them to each path but the ratio of each fragment size is changed according to only the rate of each path in transmission (for example, non-Patent document 3 and Patent document 6).

In the plural path selectable communications system, the technique has been proposed of monitoring the status of each path and selecting a path, in consideration of the path status or the delay time. (For example, refer to Patent document 1, Patent document 2, Patent document 3, Patent document 4, and Patent document 5)

Patent document 1: Japanese Patent laid-open publication No. 2000-49862
Patent document 2: Japanese Patent laid-open publication No. 2001-308917
Patent document 3: Japanese Patent laid-open publication No. 2001-333100
Patent document 4: Japanese Patent laid-open publication No. 2002-176441
Patent document 5: Japanese Patent laid-open publication No. 58-27449
Patent document 6: Japanese Patent laid-open publication No. 2000-216815
Non-Patent document 1: "Stripping Within the Network Subsystem", IEEE Network, July/August, 1995
Non-Patent document 2: Cisco Systems "Load Balancing with Cisco Express Forwarding", Cisco Application Note, January 1998
Non-patent document 3: "Adaptive Inverse Multiplexing for Wide-Area Wireless Networks", Snoeren et al, Proceedings of IEEE GlobeCom, December 1999

DISCLOSURE OF THE INVENTION

Problems to be Solved by the Invention

In the conventional technique in which radio links are in the paths between two nodes, the transmission node refers to the speed or delay of each path as a selection criterion for transmission path selection. However, because the path including a radio link dynamically changing the rate or delay tends to easily accumulate measurement errors of path status, it is difficult to accurately predict the time when a packet to be transmitted arrives at the reception side or a reception completion time. As a result, when the path selection is carried out according to the prediction result, a path of which the rate is remarkably decreased is actually selected. Therefore, the problem is that the multiplexing efficiency decreases.

A conventional technique of predicting an arrival time or a reception completion time of a transmission packet will be explained below by referring to FIG. 8.

Referring to FIG. 8, numerals 700-1, 700-2 and 700-3 represent data packets, respectively. A packet transmission history (in solid line) in the transmission node, a packet reception history (in solid line) in the reception side, and prediction (in dotted line) of a packet arrival time and a reception completion time are represented on the time axes.

First, for actual packet transmission and reception, the transmission node starts transmitting data packet 700-1 at time T1 and completes its transmission operation at time T2. The reception node starts receiving the packet 700-1 at time T3 and completes its reception at time T5.

Thereafter, the transmission node starts transmitting the data packet 700-2 at time T4 and completes its transmission at time T7. The reception node starts receiving the data packet 700-2 at time T6 because of a decrease of the communication rate and completes its reception at time T11.

Moreover, the transmission node starts transmitting the data packet 700-3 at time T8 and completes its transmission at time T9. The reception node starts receiving the data packet 700-3 at time T12 and completes its reception at time T13.

In contrast, in the conventional technique, the packet arrival time and the reception completion time are predicted based on path status information, such as transmission rate, issued from the reception node, at the reception completion of the data packet 700-1.

Referring to FIG. 8, the transmission node, for example, receives path status information from the reception node at time TX. In order to predict an arrival time and a reception completion time of the data packet 700-3, the transmission node uses path status information received at time TX. As a result, the transmission node can know the transmission delay I1 and predicts an arrival time of the data packet 700-3 at the time T10 of the transmission time T8 plus the transmission delay I1 of the data packet 700-3.

However, the actual arrival time of the data packet 700-3 is time T12 and has a margin time of error by ID to the predicted arrival time T10.

The prediction with a large difference to an actual time causes erroneous path selection, thus resulting in a decrease in multiplexing efficiency.

Such a problem may be solved if the path status at a prediction time can be obtained in real time and is reflected on the transmission time. However, it is impossible actually to receive and transmit a current path status in real time.

The present invention is made in view of the above-mentioned problems. An object of the present invention is to provide a technique of reflecting a path status obtained from the receiver side on data transmitted in past and predicting an actual data arrival time or an arrival time close to a reception completion time or a reception completion time.

Another object of the present invention is to provide a technique offering an excellent multiplexing efficiency. In this technique, when data is transferred between two nodes which can select plural paths, the path status obtained from a receiver side is reflected on data transmitted in past. An actual data arrival time or an arrival time close to a reception completion time or a reception completion time is predicted and path selection is performed based on the prediction.

Further another object of the present invention is to provide a technique of capable of using effective path resources when the performance of each path changes dynamically in data transfer between two nodes, in which plural paths are selectable and when a large round trip delay, not negligible compared with the time constant, exists.

Means to Solve the Problems

The present invention is made to solve the above-mentioned problems. In a first aspect of the present invention, a load distributing method comprises the step of path selection or path selection priority update for a pair of nodes, between which plural communication paths can be selected, upon every packet input to a transmission node, based on path status information on a selectable path, based on identification information on a time from which the path status information is effective or on a transmitted packet, and based on a transmission history after the time from which the path status information is effective or a transmission history after transmission of a packet specified with transmitted packet identification information.

In a second aspect of the present invention, a load distributing method comprises the steps of monitoring a path status of each path selectable every packet input to a transmission node between two nodes, each which can select plural communication paths, and storing path status information on the path status and a time from which the path status information is effective or packet identification information; estimating a packet arrival prediction time in each path, based on path status information, and a packet transmission history after the time from which the path status information is effective or a packet transmission history after transmission of a packet specified with the transmitted packet identification information is transmitted; and the updating path selection or selection priority, based on the estimated arrival prediction time.

In the load distributing method of the present invention, the path status information includes a delay of a path.

In the load distributing method of the present invention, the path status information includes a transmission rate of a path.

In the load distributing method of the present invention, the path status information includes a load of a path.

The load distributing method of the present invention further comprises the step of correcting a transmission cost calculation result regarding a packet transmitted before updating path status information of each path, when the path status information is updated for path selection or selection priority update.

The load distributing method of the present invention further comprises the step of discarding a history prior to a first packet transmitted on or after a time from which the latest path status information is effective, when a transmission cost calculation result of each path is corrected.

The load distributing method of the present invention further comprises the step of selecting as a packet transmission path a path having an earliest estimation value of a reception completion time at a reception node.

The load distributing method of the present invention further comprises the step of selecting as a packet transmission path a path having a largest estimation value of a data amount, which can be completely received by a specific time at a reception side.

The load distributing method of the present invention further interrupts data transmission according to an estimated current path status in each path.

In the load distributing method of the present invention, a condition for interruption of the data transmission is that an estimated reception completion time is equal to or greater than a specific value.

In the load distributing method of the present invention, path selection or transmission interruption is determined according to a policy different for each attribute of transmission data.

The load distributing method of the present invention further comprises the steps of selecting a communications interface corresponding to a destination address of a reception packet from a table which associates an address of a communications interface with a destination address reachable using the communications interface; selecting a communications interface corresponding to the transmission source address or a communications interface from among the selected communications interfaces when the reception packet has information specifying a transmission source address or a communications interface; selecting a given communications interface from among the selected communications interfaces when the reception packet does not have information on a transmission source address or a communications interface; and sending the reception packet to a selected communications interface.

Another aspect of the present invention, a node capable of selecting plural packet transmission paths comprises means for updating path selection or selection priority every input packet, based on path status information on each selectable path, based on identification information on time validating the path status information or on a transmitted packet, and based on a transmission history after the time from which the path status information is effective or a transmission history after transmission of a packet specified with transmitted packet identification information.

A node capable of selecting plural packet transmission paths comprises monitor means for monitoring a selectable path status of each path every packet input at a transmission node and monitoring path status information on the path status and a time from which the path status information is effective or packet identification information; memory means for storing the path status information and a packet transmission history available after the path status information is validated; scheduling means for estimating an arrival prediction time of a packet in each path based on the path status information and based on a packet transmission history after the path status information is validated and updating path selection or selection priority based on the estimated arrival prediction time.

In the node of the present invention, the path status information includes a delay of a path.

In the node of the present invention, the path status information includes a transmission rate of a path.

In the node of the present invention, the path status information includes a load of a path.

In the node of the present invention, the scheduling means corrects a transmission cost calculation result regarding a packet transmitted prior or updating when path status information of each path is updated in the updating of path selection or selection priority.

In the node of the present invention, the scheduling means discards a history before a first transmitted packet validating latest path status information when a transmission cost calculation result of each path is corrected.

In the node of the present invention, the scheduling means selects as a packet transmission path a path having an earliest estimation value of a reception completion time at a reception node.

In the node of the present invention, the scheduling means selects as a packet transmission path a path having a largest estimation value of a data amount which can be completely received by a specific time at a reception node.

In the node of the present invention, the scheduling means interrupts data transmission according to an estimated current path status for each path.

In the node of the present invention, a condition for interruption of the data transmission is that an estimated reception completion time is equal to or greater than a specific value.

In the node of the present invention, the scheduling means determines the interruption of path selection or transmission according to a policy different every attribute of a transmission data.

The node according to the present invention further comprises a table in which an address of a communications interface is associated with a destination address reachable using the communications interface; and routing means for selecting a communications interface corresponding to a destination address of a packet to be transmitted, from the table, selecting a communications interface corresponding to the transmission source address or a communication interface from the selected communications interface when the transmission packet has a information specifying a transmission source address or a communications interface, and sending the transmission packet to a selected communications interface.

In another aspect of the present invention, a node control program, which is applicable to a node that can select plural packet transmission paths, the node control program controlling the node as means for updating path selection or selection priority every input packet, based on selectable path status information on each path, based on identification information on time validating the path status information or on a transmitted packet, and based on a transmission history after the time from which the path status information is effective or a transmission history after transmission of a packet specified with transmitted packet identification information.

In another aspect according to the present invention, a node control program, which is applicable to a node that can select plural packet transmission paths, the node control program controlling a node as monitoring means for monitoring a selectable path status of each path for each packet input to a transmission node and monitoring path status information on the path status and identification information on time or packet validating the path status information; and scheduling means for estimating a packet arrival prediction time in each path based on the path status information and based on a transmission history of a packet after the path status information is validated and updating path selection or selection priority based on the estimated arrival prediction time.

In the node control program of the present invention, the path status information includes a delay of a path.

In the node control program of the present invention, the path status information includes a transmission rate of a path.

In the node control program of the present invention, the path status information includes a load of a path.

The node control program of the present invention further controls the scheduling means so as to correct a transmission cost calculation result regarding a packet transmitted prior or updating when path status information of each path is updated in the updating of path selection or selection priority.

The node control program of the present invention further controls the scheduling means so as to discard a history before a first transmitted packet validating latest path status information when a transmission cost calculation result of each path is corrected.

The node control program of the present invention further controls the scheduling means so as to select as a packet transmission path a path having an earliest estimation value of a reception completion time at a reception node.

The node control program of the present invention further controls the scheduling means so as to select as a packet transmission path a path having a largest estimation value of a data amount which can be completely received by a specific time at a reception node.

The node control program of the present invention further controls the scheduling means so as to interrupt data transmission according to an estimated current path status for each path.

In the node control program of the present invention, a condition for interruption of the data transmission is that an estimated reception completion time is equal to or greater than a specific value.

The node control program of the present invention further controls the scheduling means so as to determine path selection or transmission interruption according to a policy different every attribute of transmission data.

The node control program of the present invention further operates as routing means that selects a communications interface corresponding to a destination address of a packet to be transmitted, from a table in which an address of a communications interface is associated with a destination address reachable using the communications interface, selects a communications interface corresponding to the transmission source address or a communications interface, from the selected communications interface when the transmission packet has information specifying a transmission source address or a communications interface, and transmits the packet to be transmitted, to the selected communications interface.

In another aspect of the present invention, a transmission packet time estimation method for estimating an arrival time or a reception completion time of a transmission packet, comprises the steps of adding packet identification information for packet identification to a transmission packet transmitted from the transmission node and then transmitting the added information; storing a transmission history of a transmitted packet, together with packet identification information, at the transmission node; transmitting information on a path status from a reception node to a transmitter node, together with packet identification information on a last packet received in the path status; and estimating an arrival time or a reception completion time to be transmitted in the transmission node, based on the path status and a transmission history of a packet transmitted subsequent to a packet specified with packet identification information contained in the path status information.

In another aspect of the present invention, a node comprises means for adding packet identification information for packet identification to a transmission packet and transmitting the added information; means for recording a transmission history of a transmitted packet, together with packet identification information; and means for receiving path status information transmitted from a reception side and estimating an arrival time or reception completion time of a packet to be transmitted, based on the path status and based on a transmission history of a packet transmitted subsequent to a packet validating the path status.

In further another aspect of the present invention, a node control program for a node transmitting packets, the control program operates the node as means for adding packet identification information for packet identification to a transmission packet and then transmitting the added information; means for recording a transmission history of a transmitted packet, together with packet identification information; and means for receiving path status information transmitted from a reception side and estimating an arrival time or reception completion time of a packet to be transmitted, based on the path status and based on a transmission history of a packet transmitted subsequent to a packet validating the path status.

In the present invention, the transmission history of transmission data (packet) is stored at the time of transmission of data (packet). The transmission history describes, for example, identifiers for identifying transmission data (packets) and transmission start time. The reception side transmits status information (for example, rate or packet delay) of a path through which data (packets) run, to the transmission side. The path status information contains information for identifying latest data (packets), to which path status information, such as the identifier of the data (packet) described above, is applied above.

The transmission side receives path status information. Using information (for example, identifier) identifying the data (packet) contained in the path status, the transmission side acquires transmitted data (packet) validating the path status referring to the transmission history. As to data subsequent to the data (packet) obtained, the reception completion time is predicted by applying the path status received. Moreover, an arrival time or reception completion time of data to be transmitted in each path is predicted based on the prediction and based on the received status information.

In the path selection, an optimum path, for example, a path having a predicted earliest (fastest) arrival time, is selected based on the predicted data arrival time or a data reception completion time.

Effect of the Invention

According to the present invention, the path status information obtained from a reception side is applied to data (packets) transmitted in past, to which the status information is validated. By reflecting the result to predict the data (packets) to be transmitted, the arrival time or reception completion time of the data is predicted. This method can predict with higher accuracy, compared with the conventional art. The reason is that, in the conventional art, the path information obtained from the reception side is applied only to data (packets) to be transmitted to predict the arrival time or reception completion time.

According to the present invention, in order to transfer data between two nodes, each which can select plural paths, the path status information obtained from the reception side is applied to data transmitted in past which validates the information. The result is reflected to predict data to be transmitted and the data arrival time or the reception completion time is predicted. Since the path selection is performed based on the prediction, a suitable path is selected, without selecting an erroneous path due to a prediction error. Thus the problem that the multiplexing efficiency decreases can be avoided.

According to the present invention, in order to transfer between two nodes, which can select plural paths, the path resources can be effectively used even when the performance of each path dynamically changes and a large return delay, not negligible, exists, compared with the time constant.

BRIEF DESCRIPTION OF THE DRAWINGS

FIG. 14 illustrates the path to communications interface correspondence table 1330, to be saved in the memory 315-2.

FIG. 15 shows the configuration of the transmission IP packet creation data 1510.

FIG. 16 shows the configuration of the delivery IP packet 1610.

FIG. 21 is a diagram illustrating entries of the path control table 1321.

EXPLANATION OF SYMBOLS

Figure 1:
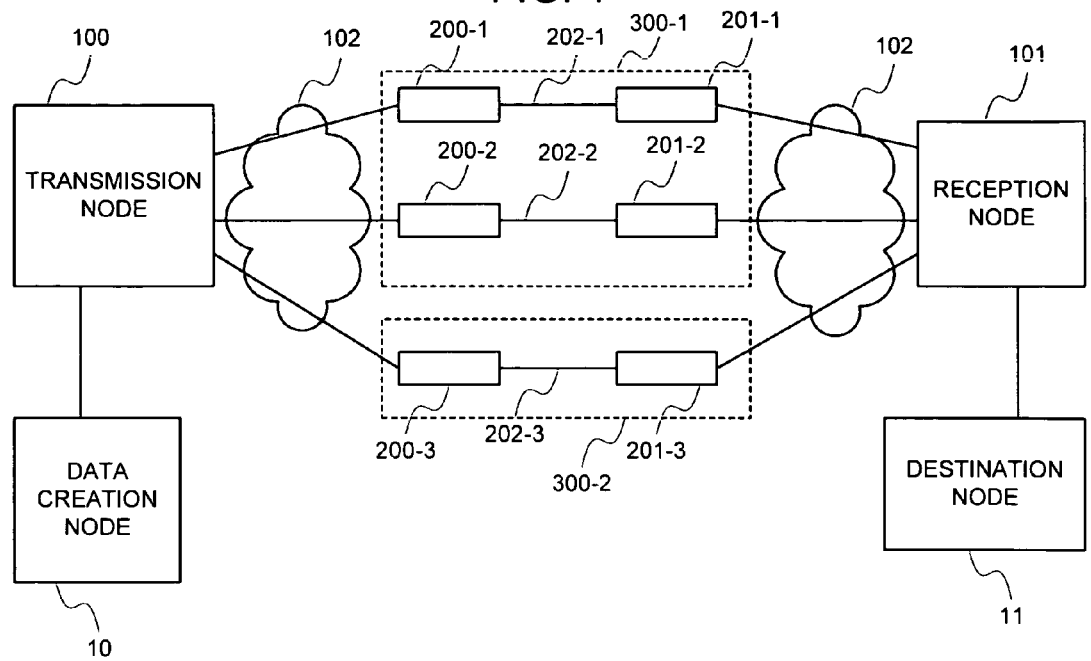
FIG. 1 is a diagram illustrating a path between nodes, according to the present invention.

10 Data creation node
11 Destination node
100 Transmission node
101 Reception node
102 Cable network
200 Radio transmitter
201 Radio receiver
202 Radio link
300 Radio network
310 Communications interface
312 Queuing section
313 Scheduler
314 Path status monitor
315 Memory

BEST MODE FOR CARRYING OUT THE INVENTION

A best mode for carrying out the present invention will be explained below.

It is assumed that an aspect of the present invention is applied to the technique combining plural paths, of which the rate as well as the delay vary dynamically, particularly, paths including radio links to construct one logical path. Inverse multiplexing will be explained below as an example of a technique of constructing one logical path through a combination of plural paths.

FIG. 1 shows a structural example of the present embodiment.

Referring to FIG. 1, a transmission node 100 and a reception node 101, each implementing inverse multiplexing, exist in a path between a data creation node 10 and a destination node 11. There are three paths between the transmission node 100 and the reception node 101. Radio links 202-1 to 202-3 are respectively in communication paths between radio transmission means 200-1 to 200-3 and radio reception means 201-1 to 201-3. Three paths are shown in FIG. 1 but two paths or more may be disposed. All paths between the transmission node and the reception node may be constructed by radio. However, the paths generally include cable networks 102. Generally each radio link belongs to a different radio network 300. In this example, the path 202-1, 202-2 is a Cellular network 300-1 and the radio network 300-2 is a radio LAN.

In the system of FIG. 1, the transmission node 100 distributes traffics received by the data creation node 10 to respective paths, based on the status information. The reception node 101 reintegrates the traffics sent from the transmission node 100 via respective paths and transmits the result to the destination node 11.

Figure 2:
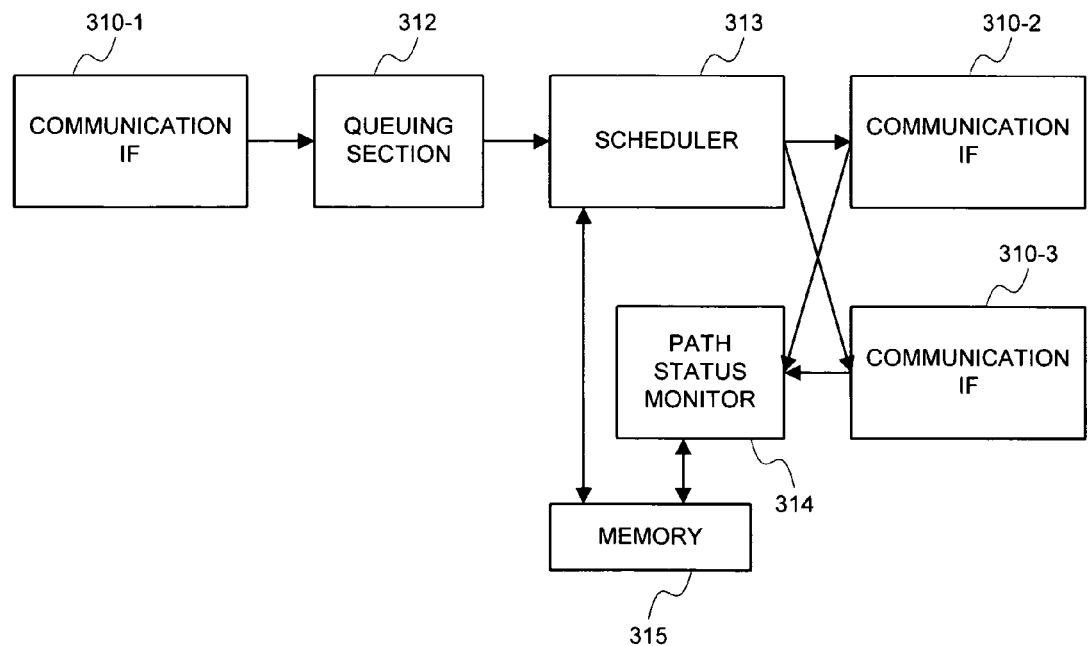
FIG. 2 is a diagram illustrating the configuration of a transmitter node.

The internal configuration of the transmission node 100 is shown in FIG. 2.

The communication interface 310-1 receives traffics transmitted from the data creation node 10 toward the destination node 11. The transmission side communication interface 310-2 or 310-3 in an inverse multiplexing link transmits the traffics via the queuing section 312 and the scheduler 313. In some cases, plural paths share the physical link closer to the transmission node. Hence, the paths constructing the inverse multiplexing link do not necessarily correspond to the communications interfaces one by one.

The scheduler 313 takes input data out of the queuing section 312 and sends it to a specific path. The path selection for the transfer of the captured data is implemented by referring to the status of the path managed by the path status monitor 314. The path status monitor 314 intermittently receives status information of each path and information identifying a transmission packet validating updating (hereinafter referred to as a report), from the reception node 101 via the communications interface 310-2 or 310-3. Thus, the path status monitor 314 updates path status information stored in the memory 315 based on them.

The path status information generally represents information on a communication performance indicator of communication performance. The present embodiment uses a path rate and a packet delay in path status information. An effective time of path status information does not means updating of path status information in the transmission node but means the time when a path becomes a path status shown with the path status information or a time specified with a packet transmitted in the path status. Hence, a transmission history after the effective time of path status information means a packet transmission history transmitted after the effective time of path status information. The time is obtained based on packet information (identifier identifying a packet) originally used for the time measurement or based on a reception time transmitted from the reception node. However, the time may be varied somewhat. Various methods in which the reception node measures the rate and delay to obtain path status information have been proposed. The method assumed in the present embodiment will be described below.

The transmission node 100 inserts an identifier and a transmission time in each packet transmitted to the reception node 101 and then transfers the combined data. The reception node measures the packet delay by comparing the transmission time inserted in the transmission node with the time when the reception node itself has received the packet. The transmission node periodically transmits a train of packets for measurement and the reception node can estimate the rate based on variations of the arrival times. The estimation method is disclosed in detail, in for example, "What Do Packet Dispersion Techniques Measure?" written by Dovrolis, Ramanathan, and Moore, IEEE INFOCOM 2001. In the document by Dovrolis et al., the transmission node simultaneously transmits two packets and the transmission side estimates the link rate based on a difference between arrival times of two packets. The transmission delay spreads a packet arrival interval. Because the transmission delay relates to a link rate, the rate can be estimated by the arrival interval.

The reception node 101 periodically transmits those measurement values as path status information to the transmission node 100. At the same time, the reception node 101 transmits the identifier of the latest packet identifier received by that time as packet identification information validating status information to be transmitted. The transmission node receives those sets of information as reports. This system has been shown as an example. The enabling possibility of the invention does not depend on the method of determining and transmitting path status information and a packet validating the path status information.

As to the packet to be next transmitted, the scheduler 313 refers to a transmission history available after current path information and a packet validating the information are transmitted for each transmission path. Thus, the scheduler 313 predicts a delay of the packet arriving at the reception node 101. The transmission history is stored in the memory 315. The scheduler 313 selects a path with a predicted minimum arrival delay as a transmission path for a packet to be next transferred and adds the transfer time to the transmission history in the memory 315 after the packet transfer to the selected path.

Figure 3:
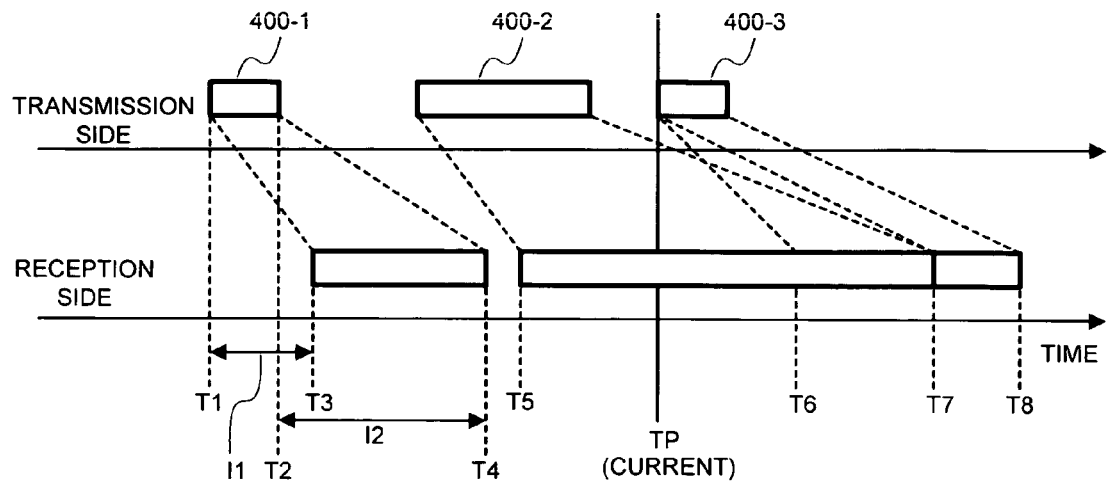
FIG. 3 is a diagram explaining the timing of a packet process at a transmitter node and the timing of a packet process at a receiver node, according to an embodiment of the present invention.

FIG. 3 illustrates an arrival delay estimation method for each path operated with the scheduler 313. In FIG. 3, numeral 400-1, 400-2, or 400-3 represents a data packet. The transmission history and prediction in the transmission node 100 and the reception history and prediction in the reception node 101 are shown on the time axes, respectively. The transmission node, for example, starts transmitting the data packet 400-1 at time T1 and then ends its transmission operation at time T2. Moreover, the reception node starts receiving the packet 400-1 at time T3 and then completes its reception operation at time T4. The difference I1 between time T1 and time T3 corresponds to a transmission delay. The difference I2 between time T4 and T2 corresponds to a total delay, which is the transmission delay I1 plus a packet dispersion occurring due to the rate difference between the transmission interface and the transfer path.

Here, it is assumed that the packet 400-3 is transmitted at the current time being the point TP on the time axis. As to the path, the path status information is updated because a report result report is received between T5 and TP. The path status information is validated from the packet 400-1. The reception completion time of the packet 400-3, in consideration of the packets 400-1 and 400-2, is estimated based on the transmission history of the packet (400-1, 400-2) validating the path status information.

The reception start time and the completion time of the packet 400-2 transmitted behind the packet 400-1, in the reception node 101, are estimated based on the rate and the transmission delay containing path status information currently being received. In FIG. 3, the estimated reception start time is T5 and the reception completion time is T7. If the delay time shown with the path status information is equal to I1, the packet 400-3 transmitted at TP is to be received at time T6. However, it is assumed that the reception node has not yet completely received the packet 400-2. Hence, the estimated reception start time of the packet 400-3 is assumed to be T7 at which the packet 400-2 is completely received. The estimated reception completion time of the packet 400-3 becomes T8, to which the packet dispersion estimated from the path rate, contained in the path status information, is added. Similarly, the reception completion time of the packet 400-3 is estimated for each path. The packet 400-3 is transmitted to a path providing a fastest reception time.

The path status information used for arrival time estimation of the reception side at time TP in FIG. 3 is updated upon notification of a report result between T5 and TP. The arrival time of the packet 400-2 transmitted is estimated based on old path status information at TP. It is assumed that the old status information is information A and that new information updated between T5 and TP is information B. If the delay and path rate contained in the information A and B differ from each other due to variations of the link status, the arrival time estimation based on the information A will differ from the arrival time estimation based on information B shown in FIG. 3. Therefore, the arrival time prediction of the packet 400-1 and the arrival time prediction of the packet 400-2 shown in FIG. 3 reflect on correction of the result obtained with the information B. When the path status information is once updated, the transmission histories of packets prior to the packet validating the updating are discarded because they are unnecessary for reference.

Moreover, a difference between the packet arrival time estimation and reception completion time in the present invention and the packet arrival time estimation and reception completion time in the conventional art will be specifically explained below by referring to FIG. 7.

Figure 7:
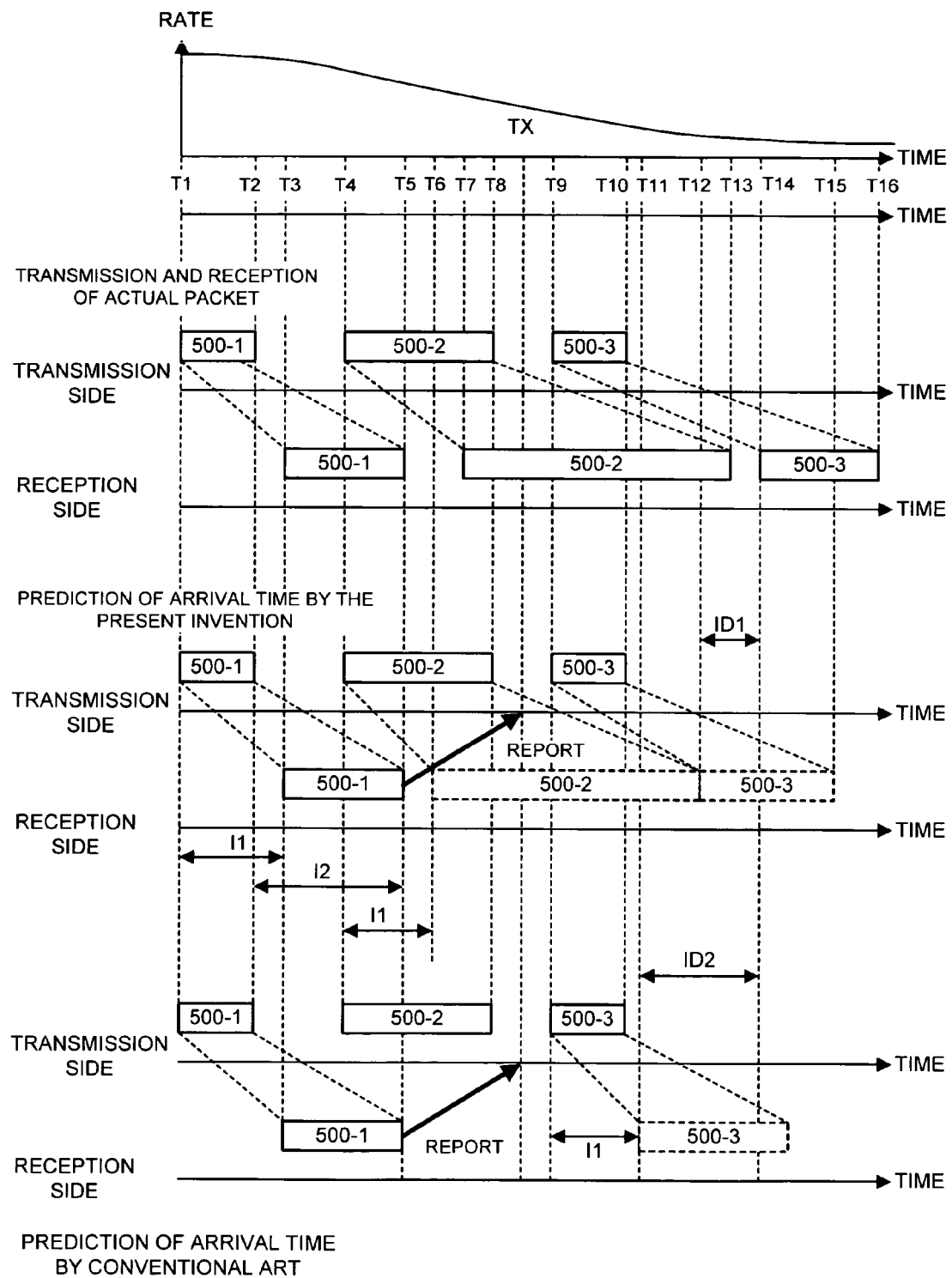
FIG. 7 is a diagram explaining prediction of an arrival time or a reception completion time at a transmitter node and prediction of an arrival time or a reception completion time at a receiver node, according to an embodiment.
Figure 8:
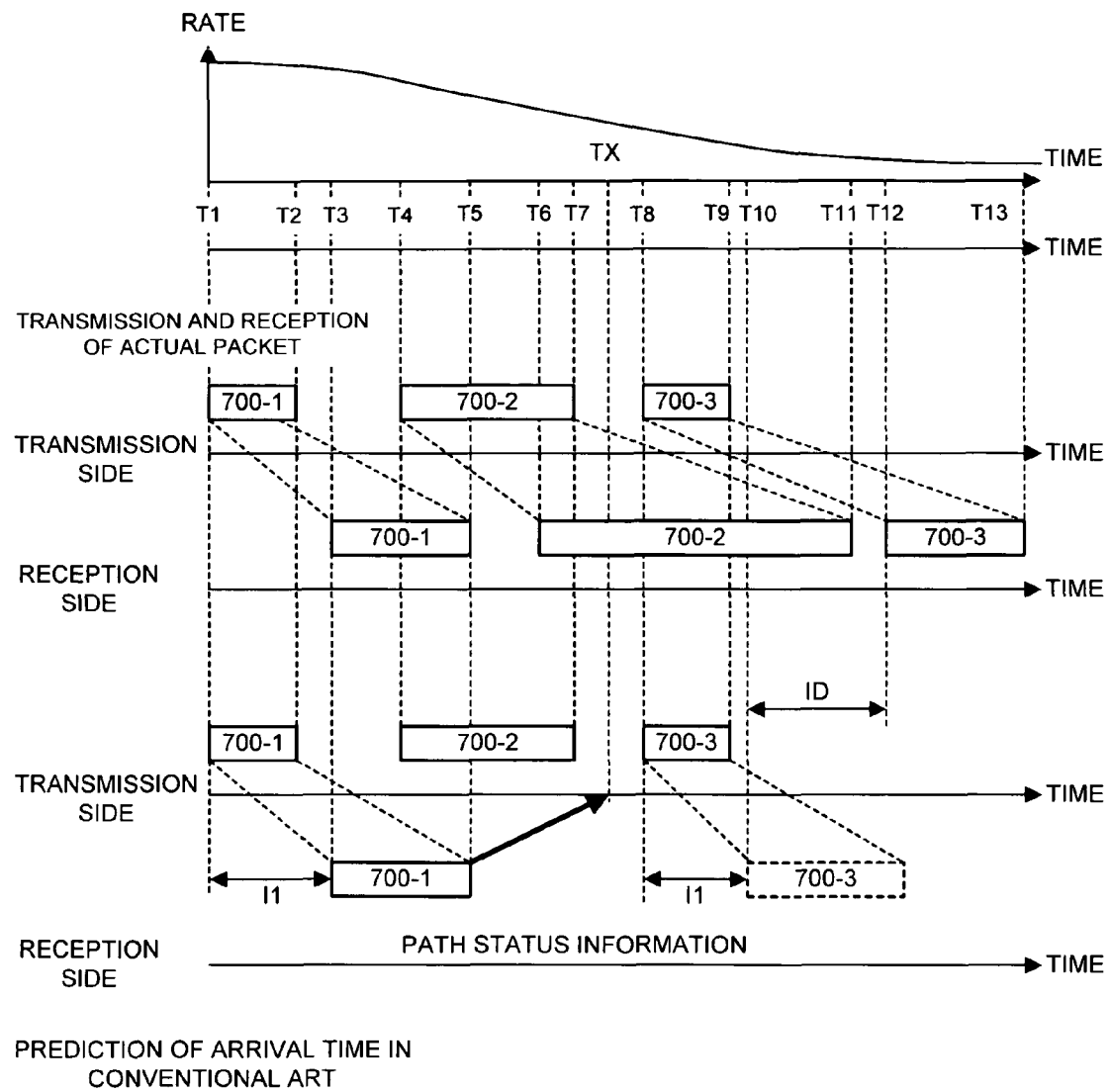
FIG. 8 is a diagram explaining a conventional art.

Referring to FIG. 7, numeral 500-1, 500-2, or 500-3 represents a data packet to be transmitted. The transmission history (in solid line) of a packet in the transmission node and the reception history (in solid line) of an actual packet in the reception node are indicated on the time axes, respectively. The prediction (in dotted line) of a packet arrival time and a reception completion time are indicated on the time axes. On the upper portion of FIG. 7, the curve shows a rate change of a transmission path. FIG. 7 shows the status where the transmission rate delays with an elapse of time.

In actual transmission and reception of packets, the transmission node first starts transmitting the data packet 500-1 at time T1 and terminates the transmission at time T2. The reception node starts receiving the data packet 500-1 at time T3 and terminates the reception at time T5.

Thereafter, the transmission node starts transmitting the data packet 500-2 at time T4 and terminates its transmission at time T8. The reception node starts receiving the data packet 500-2 at time T7 due to a decrease in communication rate and terminates the reception at time T13.

Moreover, the transmission node starts transmitting the data packet 500-3 at time T9 and terminates the transmission at time T10. The reception node starts receiving the data packet 500-3 at time T14 and terminates the reception at time T16.

Next, prediction of a packet arrival time and a reception completion time according to the present invention in the actual packet transmission and reception will be explained below.

The transmission node starts transmitting the data packet 500-1 at time T1, together with information on the transmission time and the packet identifier of the data packet 500-1, and terminates its transmission at time T2. The transmission node stores as a transmission history the transmission time and the packet identifier of the data packet 500-1.

In succession, the transmission node starts transmitting the data packet 500-2 at time T4, together with the information on the transmission time and the packet identifier of the data packet 500-2 and terminates the transmission at time T8. At this time, in a manner similar the above-mentioned method, the transmission node stores as a transmission history the transmission time and the packet identifier of the data packet 500-2.

The reception node starts receiving the data packet 500-1 at time T3 and terminates the reception at time T5. At this time, the reception node transmits as a report information on the identifier and the reception completion time and the communication rate of the data packet 500-1, to the transmission node.

If receiving a report from the reception node at time TX, the transmission node decides the transmission time T1 of the data packet 500-1 at the time the path status information of the report validates, based on the identifier of the data packet 500-1 contained in the report.

The transmission node predicts the arrival time and the reception completion time of the data packet 500-3, based on the transmission history after the time T1. In the transmission history after the time T1, the data packet 500-1 and 500-2 are to be handled. According to the report, the reception completion time of the data packet 500-1 is time T5. The arrival time and the reception completion time of the data packet 500-2 are used to predict the communication rate and the reception completion time of the data packet 500-1 in the report. Based on those sets of information, the transmission delay or the total packet delay time is known. The transmission delay is the difference I1 between time T1 and time T3. The total delay of a packet is the transmission delay I1 plus the packet dispersion caused by the rate difference between the transmission interface and the transfer path. The difference between time T5 and time T2 is I2. The arrival time of the data packet 500-2 is obtained based on the transmission delay I1 and is predicted to be the time T6, which is the transmission time T4 of the data packet 500-2 plus the transmission delay I1. Since the packet delay can be obtained based on the communication rate in the report, the reception completion time of the data packet 500-2 is predicted to be time T12. Hence, in this path, the arrival time of the data packet 500-3 in the reception node can be predicted to be a time after the time T12. When the reception starts from the time T12, the reception completion time can be predicted to be time T15 through the packet dispersion prediction. According to the prediction results, the difference between the arrival time T12 of the predicted data packet 500-3 and an actual arrival time T14 of the data packet 500-3 is time ID1.

In the prediction of an arrival time and a reception completion time of a packet in the conventional art, the path status shown in a report obtained by the reception node is validated at the report arrival time of the report. The path status is applied, without any change, to predict the data packet 500-3. That is, the arrival time of the data packet 500-3 is predicted to be the time T11, which is the transmission time T9 of the data packet 500-3 plus the transmission delay I1. In such a prediction result, the difference between the arrival time T11 of the expected data packet 500-3 and the arrival time T14 of the actual data packet 500-3 is time ID2.

As apparent from the drawing, as to the error time ID1 and the error time ID2 with respect to an actual arrival time, the error time ID1 predicted according to the present invention is smaller than the error time ID2.

Figure 4:
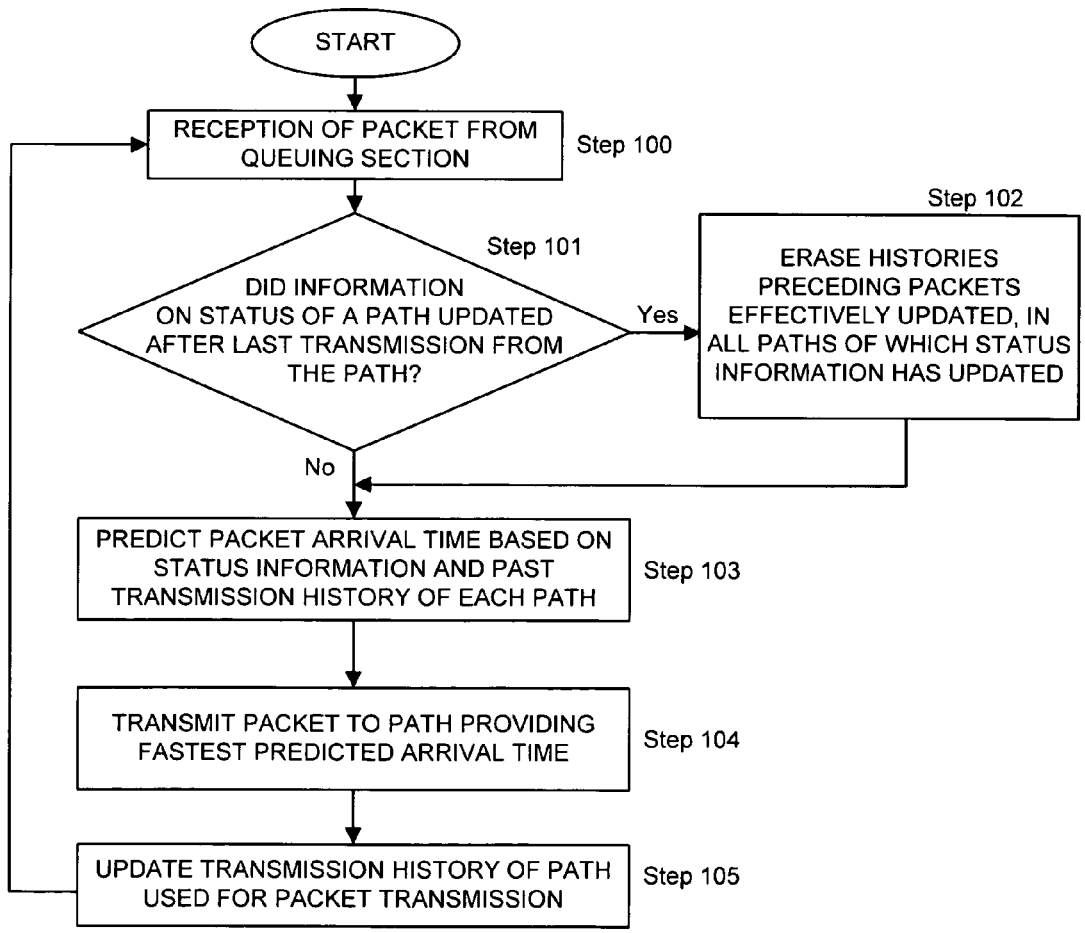
FIG. 4 is an operational flowchart for a scheduler according to an embodiment.

Next, the procedure of selecting the path of a scheduler, containing the above-mentioned arrival time estimation, is shown in FIG. 4.

First, the queuing section 312 receives packets (step 100).

Next, after the last packet was transmitted through any one of paths, it is decided whether or not the path status information has been updated (step 101). When the path status information is updated, the transmission histories existing before the path status information is validated are erased in all the updated paths (step 102).

In succession, in each path, the packet arrival time is predicted (estimated) based on the path status information and the transmission history (step 103). Thus, a packet is transmitted to the path a predicted (estimated) fastest arrival time (step 104).

Finally, the transmission history of the path used for packet transmission is updated (step 105).

As described above, in the updating of path status information, the predicted arrival time of a packet transmitted before the updating is corrected. The corrected arrival time is reflected on judgement of the subsequent packet transmission. Accordingly, the past transmission record can be compensated. The effect of the compensation becomes significant when the round delay of each path result is larger and cannot be ignored to the cycle of the path status variation. The reason will be described below.

Where the path status variation occurs in the time such as a round delay, the status of the corresponding path may have already changed when the transmission node captures a set of status information. Hence, such information is unreliable. Therefore, it is impossible to optimize the path selection and the timing setting at the time of packet transmission. Generally, the packet is transmitted with an unsuitable path and with an unsuitable timing. Correcting the arrival time prediction upon the status information updating is equivalent to estimating the already performed unsuitable transmission impact from a lapse of the interval between status information updating operations. For example, when the packet has been transmitted at an excessive rate, the arrival prediction time of a transmitted packet is extended through the updating of the status information. This increases the path transmission cost.

As described above, the correction of the arrival time prediction of a past transmission packet due to the updating of status information effectively optimizes the path selection. However, when the correction of the arrival time prediction is fed back for the transmission timing control, in addition to the path selection, the congestion control of each path is optimized in the long term.

Next, another embodiment will be explained below.

An operation of the following embodiment embodying the simple timing control will be explained below.

In a manner similar to that of the above-mentioned embodiment, another embodiment estimates a reception completion time of a transmission packet for each path and selects a path having a highest evaluation value. However, the embodiment can introduce the simple timing control, under which an allowable estimation delay is defined for a new path and the transmission node 100 controls the transmission timing such that the estimation delay does not exceed the allowable estimation value. The operation of the embodiment will be explained by referring to FIG. 5.

Figure 5:
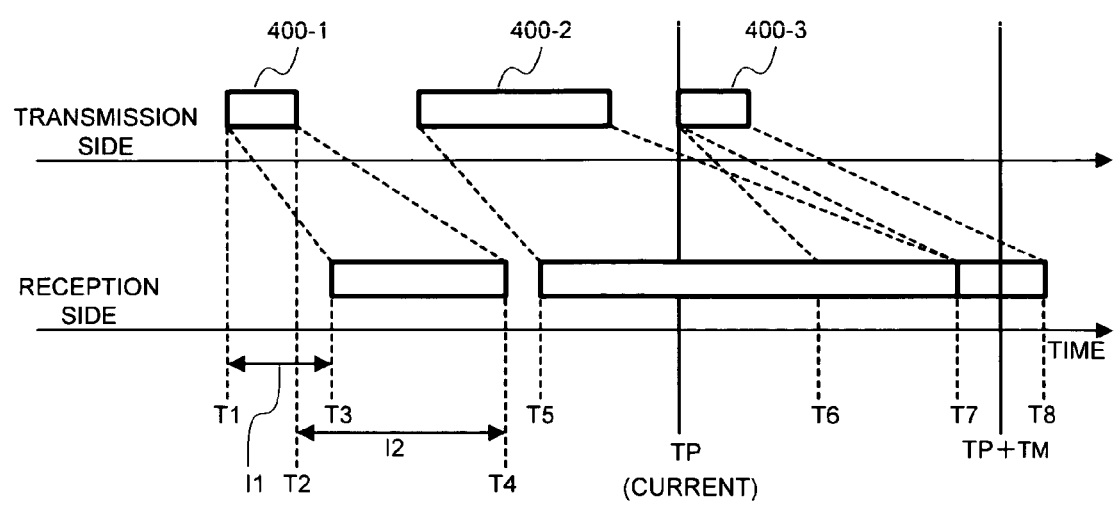
FIG. 5 is a diagram explaining the timing of a packet process at a transmitter node and the timing of a packet process at a receiver node, according to another embodiment of the present invention.
Figure 6:
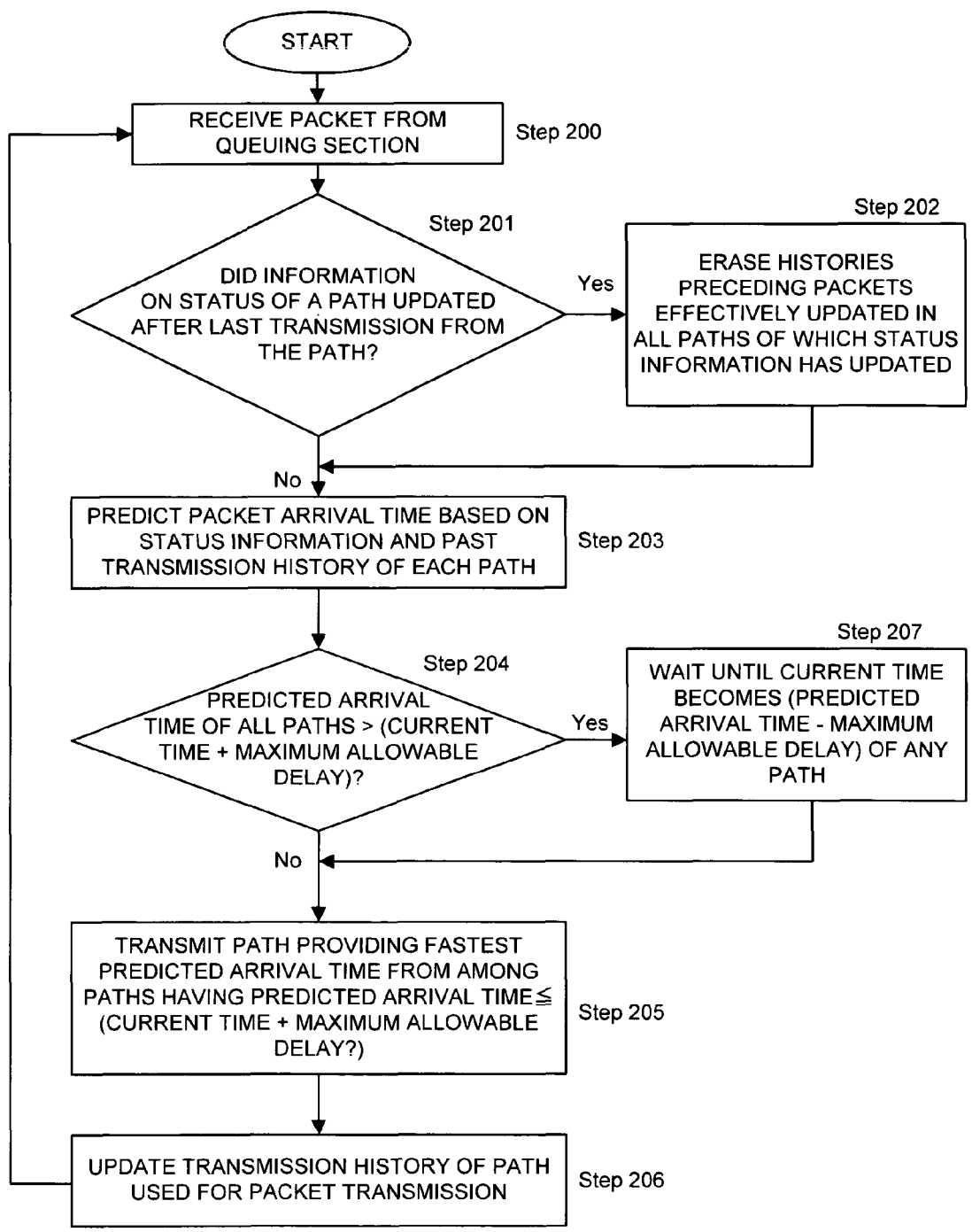
FIG. 6 is an operational flowchart for a scheduler according to another embodiment.

In FIG. 5, the allowable estimation delay TM means that it must be estimated that a packet is completely received by TM+TP to transmit the packet at TP. The reception completion time of the packet 400-3 estimated with the means, identical to that in the above embodiment, becomes T8 corresponding to a future value with respect to (TM+TP). The transmission node 100 cannot transmit the packet 400-3 out of the path until the estimated reception completion time becomes TM+TP. In this case, the transmission node 100 retains the packet 400-3 until the estimated reception completion time of any one of paths becomes TM+TP or less. The transmission node 100 transmits the packet through the path of which the retention is released at an earliest time. The operation flow of the scheduler 313 in that mode is shown in FIG. 6.

First, the queuing section 312 receives a packet (step 200).

Next, it is decided whether or not the path status information updated after the last packet has been transmitted via any one of paths (step 201). When the path status information is updated, transmission histories available before the path status information is validated are erased in all the updated paths (step 202).

In succession, the packet arrival time is predicted (estimated) based on the path status information and the transmission history in each path (step 203). Using the predicted (estimated) arrival time, it is decided whether or not a predicted (estimated) arrival time>(a current time+an allowable estimation delay) in all paths (step 204). In the case of (predicted (estimated) arrival time)≦(current time+allowable estimation delay) in any one of paths, the packet is transmitted to the path with an earliest predicted (estimated) arrival time of the paths (step 205).

When (predicted (estimated) arrival time)>(current time+ allowable estimation delay) is held in all paths, the status is waited until the current time becomes (predicted arrival time− allowable estimation delay) in any one paths. When the conditions are satisfied in any one of paths, the flow proceeds to the step 205 (step 206).

Finally, the transmission history of the path used for packet transmission is updated (step 207).

The allowable delay value TP may be set independently for each path. For example, when the delay of each path or the buffer amount of a server through which the packet pass is largely different, a different TM set value may be set in each path, particularly, under a heavy load. Thus, it is considered that the band of each path can be effectively used.

If a packet missing ratio and a line use charge, for example, can be monitored in addition to an estimated reception completion time, they may be estimated preferentially. The decision method may depend on the data attribute. For example, the selection is performed which places greater emphasis on delay for voice data or on the line use charge for file transfer data not urgent. In any case, the present invention is characterized by capturing a transmission packet or time validating the updating at the same time when the transmission node updates path status information, estimating an impact of the transmission cost with the transmission history available after the effective packet or effective time, and transmitting the next packet to a cost minimized path. As a result, even when the delay is large, not negligible to the time constant of path status variation, the impact to cost standard already provided through the past unsuitable transmission can be reflected on the adjustment the subsequent transmission timing to compensate the delay. Thus, the path use efficiency is effectively improved.

Figure 9:
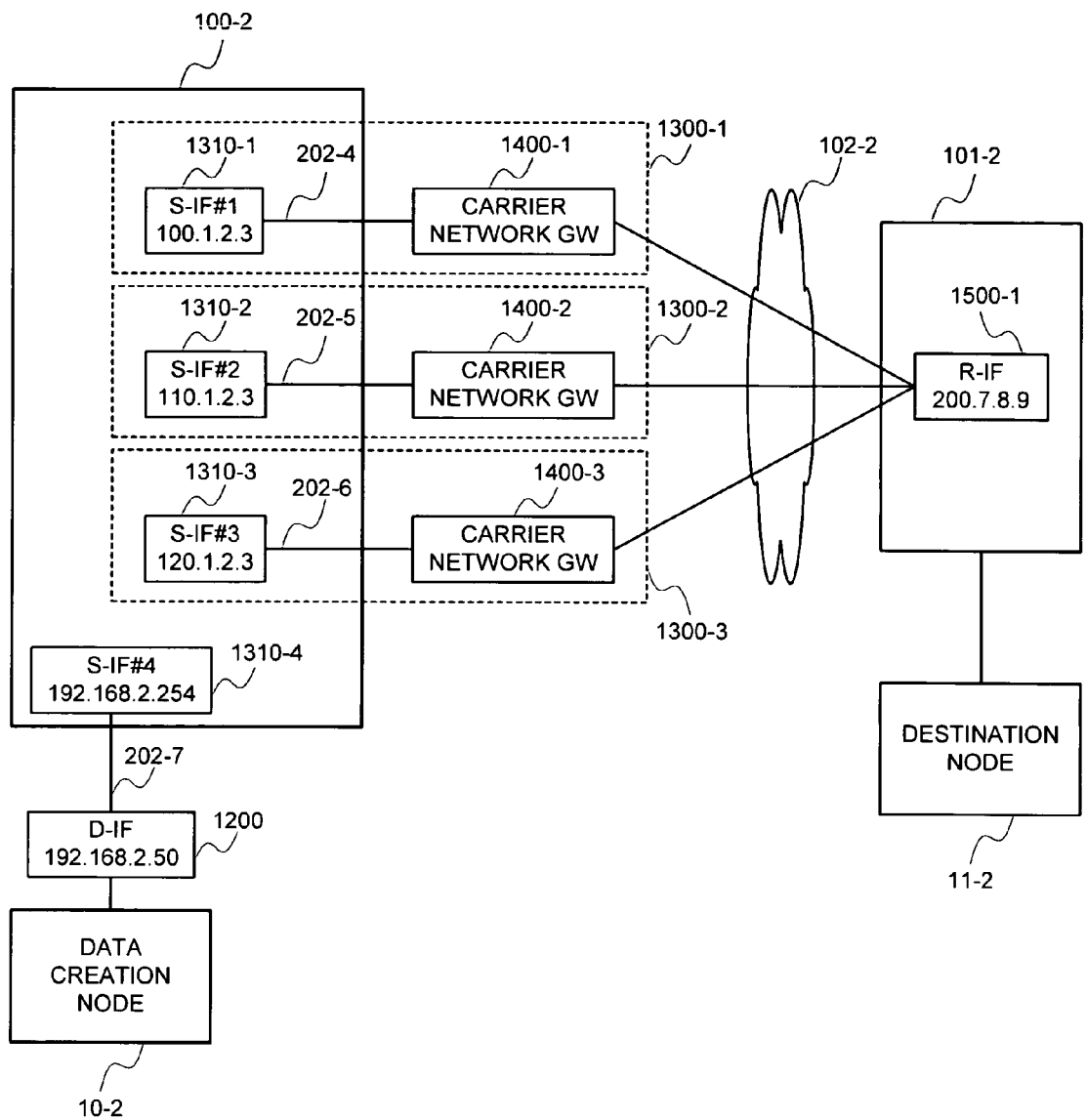
FIG. 9 is a configuration example where a communications interface has an individual IP address.

Next, the path selecting method of the present invention, applied to the IP network as shown in FIG. 9, will be explained below.

FIG. 9 shows the configuration of the communications interface having an individual IP address, in the present embodiment.

Referring to FIG. 9, the transmission node 100-2 and the reception node 101-2, each having plural paths, are between the data creation node 10-2 and the address node 11-2. Three paths are between the transmission node 100-2 and the reception node 101-2. In the configuration of FIG. 9, the transmission node 100-2 includes communications interfaces S-IF#1 1310-1, S-IF#2 1310-2, S-IF#3 1310-3, and S-IF#4 1310-4, acting as transmission means. The communications interfaces S-IF#1 1310-1 to S-IF#3 1310-3 belong to radio networks 1300-1 to 1300-3, respectively. The communications interfaces S-IF#1 1310-1 to S-IF#3 1310-3 are connected to the carrier network gateways 1400-1, 1400-2 and 1400-3, which are installed in the cellar carrier network, via the radio links 202-4 to 202-6, respectively. The communications interface S-IF#4 1310-4 is connected to the communications interface D-IF 1200, installed in the data creation node 10-2, via the cable link or radio link 202-7. The reception node 101-2 includes as reception means the communications interface R-IF 1500-1. The reception node 101-2 is connected to the carrier network gateways 1400-1 to 1400-3 via the communications interface R-IF 1500-1 and the cable network 102-2.

In the system of FIG. 9, the communications interfaces S-IF#1 1310-1 to S-IF#3 1310-3 use Point-to Point Protocols (PPP) to allocate [100.1.2.3], [110.1.2.3] and [120.1.2.3] as individual IP addresses, respectively. Moreover, the communications interface R-IF 1500-1 includes fixedly setting means or DHCP means to allocate [200.7.8.9] as an IP address. The communications interface D-IF 1200 includes fixedly setting means or DHCP means to allocate [192.168.2.50] as an IP address.

Figure 10:
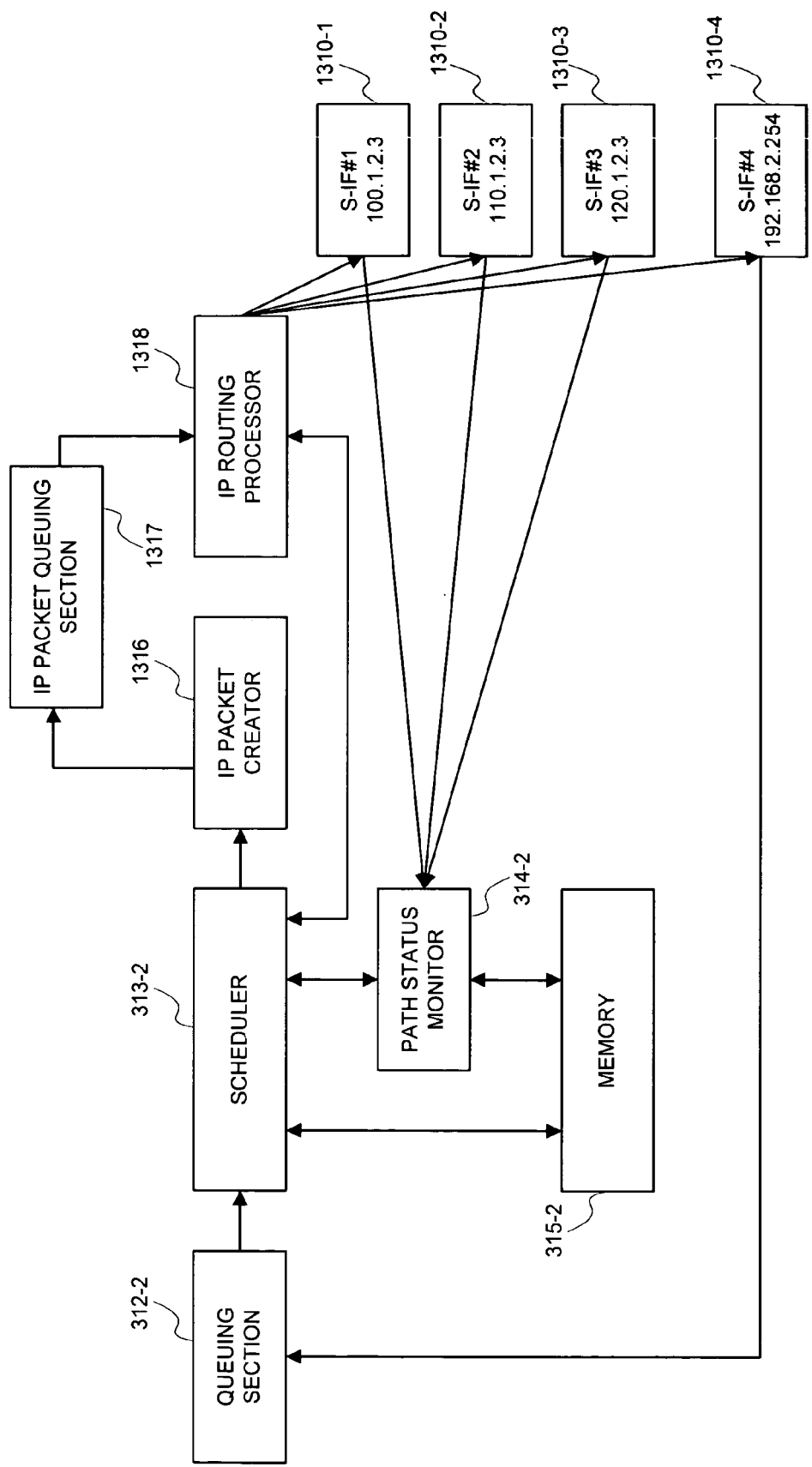
FIG. 10 is a diagram illustrating the internal configuration of the transmission node 100-2 in the system of FIG. 9.

FIG. 10 illustrates the internal configuration of the transmission node 100-2 in the system of FIG. 9. For the IP communications, the transmission node 100-2 includes a packet queuing section 312-2, a scheduler 313-2, a path status monitor 314-2, a memory 315-2, an IP packet creator 1316, an IP packet queuing section 1317, and an IP routing processor 1318.

The scheduler 313-2 derives input data (destination data and transmission data) from the queuing section 312-2 to select a specific communications interface. The communications interface (path) used to transfer the derived data is selected by referring to the path status managed by the path status monitor 314-2. In the path selection method by the scheduler 313-2 and the path status monitor 314-2, the path is selected and decided, in a manner similar to that by the scheduler 313 and the path status monitor 314. The memory 315-2 stores the path status information, in a manner similar to that of the memory 315. The following explanation is made as to the scheduler 313-2 and the path status monitor 314-2, which select the communications interface (path), in the operation similar to the above-described operation.

The IP packet creator 1316 adds an IP header to data received from the scheduler 313-2 to create an IP packet. The IP packet queuing section 1317 is a buffer for storing an IP packet created by the IP packet creator 1316. The IP routing processor 1318 derives an IP packet stored in the IP packet queuing section 1317, decides the next transfer destination of the IP packet, and transmits it using a suitable one of the communications interfaces S-IF#1 1310-1 to S-IF#4 1310-4.

Figures 11, 12:
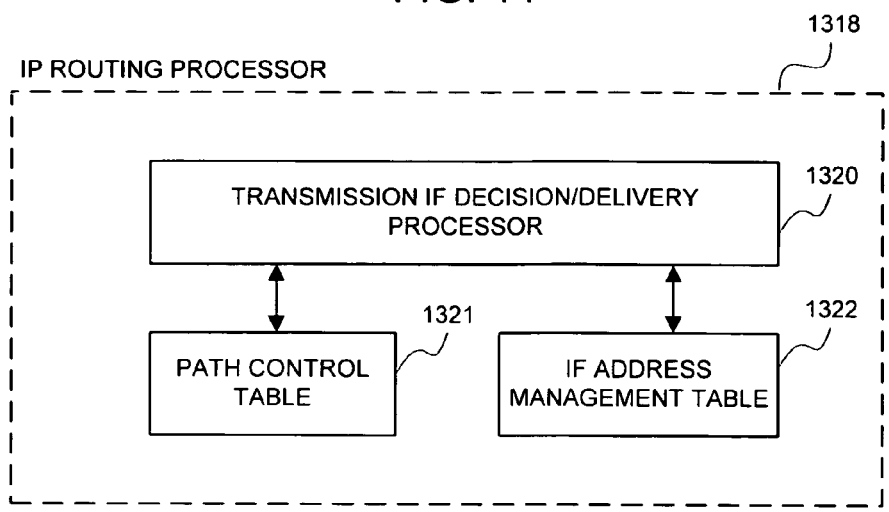
FIG. 11 is a diagram illustrating the IP rooting processor 1318.
FIG. 12 is a diagram illustrating the path control table 1321.

FIG. 11 is a diagram representing the configuration of the IP routing processor 1318. The IP routing processor 1318 has a path control table 1312 (shown in FIG. 12) used to decide the transfer destination of an IP packet handed over. Moreover, the IF address management table 1322 (shown in FIG. 13), which records IP addresses allocated to installed communications interfaces, is prepared. The path control table includes a transmission IF decision/transmission processor 1320. Using the path control table 1321 and the IF address management table 1322, the transmission IF decision/transmission processor 1320 decides the transfer destination of an IP packet handed over to the IP routing processor 1318 and then transmits the IP packet to the corresponding communications interfaces S-IF#1 1310-1 to S-IF#4 1310-4.

FIG. 14 depicts an example of a table storing correspondences between communication paths and the corresponding communications interfaces, which are stored in the memory 315-2, (hereinafter referred to as a path to communications interface correspondence table 1330). Communication path numbers, or identifiers, for respective communication paths, recognized by the scheduler 313-2 and the path status monitor 314-2, and communications interface names used for communication path connection are stored in the entries of the path to communications interface correspondence table 1330.

In the path control table 1321 shown in FIG. 12, a network mask and a gateway IP address representing the next transfer destination to send an IP packet to the network are generally described for each destination network IP address being an IP packet transmission destination. The path control table 1321 also records information on a communications interface connected to the sub-network having the same address as that of the gateway IP address. Actually, a multicast address may be often set to transmit packets to all communication equipment belonging to the same sub-network. However, the illustration and explanation will be omitted here.

Figure 13:
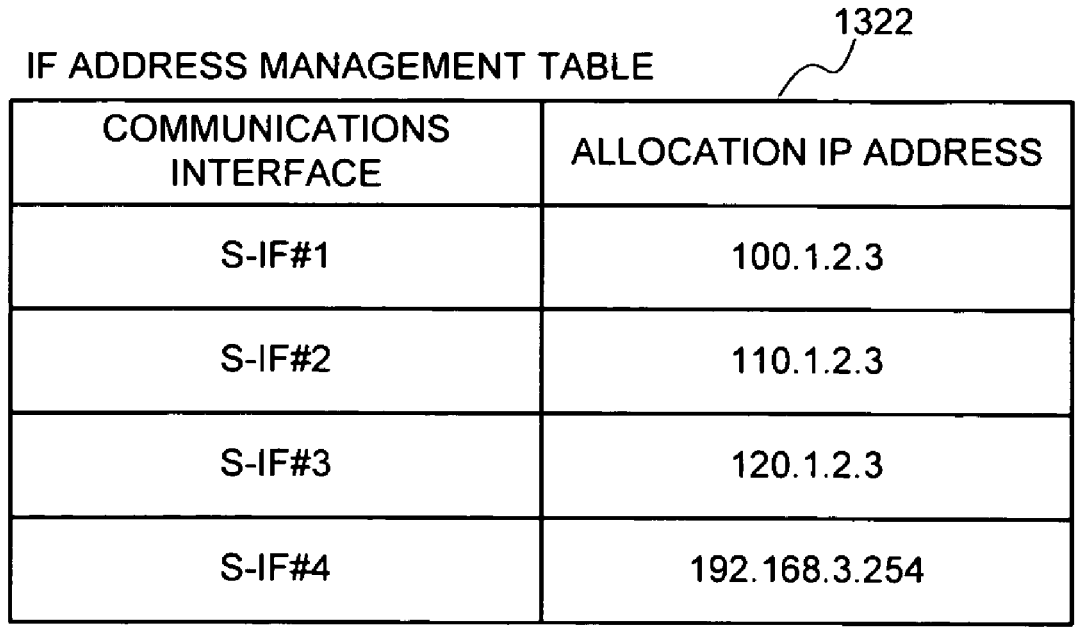
FIG. 13 is a diagram illustrating the IF address management table 1322.

The IF address management table 1322, shown in FIG. 13, records correspondences between communications interfaces installed in the transmission node and IP addresses allocated to them. The content of the IF address management table 1322 is updated every time the IP address allocated to each communications interface is changed.

In the present embodiment, the reception node 101-2 includes as reception means the communications interface R-IF 1500-1. The transmission node 100-2 includes the communications interfaces S-IF#1 1310-1 to S-IF#4 1310-4, each to which a different IP address is allocated. For that reason, the path control table 1321 has entries 1321-*a*, 1321-*b* and 1321-*c*, which register different gateway IP addresses and different communications interfaces, respectively, to the same destination network IP address of [200.7.8.9]. Moreover, the path control table 1321 has the path information 1321-*d* being path information to the data creation node 10-2.

The transmission IF decision/transmission processor 1320 implements the so-called IP routing process that decides an interface used to transmit an IP packet, using the header information of the received IP packet and the path control table 1321.

The present embodiment, as shown in FIG. 12, has plural entries in which "destination network IP networks" are overlapped. The IP routing process decides an interface used for delivery.

Thereafter, in the present embodiment shown in FIG. 9, the scheduler 313-2, for example, selects a transmission path having the communication path number 3, registered in the path to communications interface correspondence table 1330. Thus, the IP packet is transmitted using the communications interface S-IF#2 202-5 corresponding to the decided path. Selecting other path can be realized in the same process.

When selecting the communication path of the communication path number 3, the scheduler 313-2 acquires the communications interface S-IF#2 corresponding to the communication path from the path to communications interface correspondence table 1330.

Next, the scheduler 313-2 retrieves the IF address management table 1322 within the IP routing processor 1318 as the captured communications interface S-IF#2 and then obtains the IP address [110.1.2.3] allocated to the communications interface S-IF#2. Next, the scheduler 313-2 creates the transmission IP packet creation information (hereinafter, referred to as transmission IP packet creation data) and then hands it over the IP packet creator 1316.

FIG. 15 shows the configuration of the transmission IP packet creation data 1510. The creation data 1510 stores as "destination IP address" the IP address [200.7.8.9] of the communications interface 1500-1 of the reception node 101-2 and stores as "transmission source IP address" the IP address [110.1.2.3] of the communications interface S-IF#2 1310-2.

The IP packet creator 1316 creates the transmission IP packet 1610, shown in FIG. 16, based on the received transmission IP packet creation data 1510, and adds it to the IP packet queuing section 1317. Based on the information contained in the transmission IP packet creation data 1510, the transmission IP packet 1610 stores the IP address [110.1.2.3] of the communications interface S-IF#2 1310-2 in the "transmission source IP address" field of the IP header. Moreover, the transmission IP packet 1610 stores the IP address [200.7.8.9] of the communications interface R-IF 1500-1 of the reception node 101-2 in the "destination IP address" field of the IP header.

Next, in the IP routing processor 1318, the transmission IF decision/delivery processor 1320 derives the transmission IP packet 1610 from the IP packet queuing section 1317 and decides the communications interface handing over the transmission IP packet, using the path control table 1312 and the IF address management table 1322. Thus, the transmission process is executed.

Figure 17:
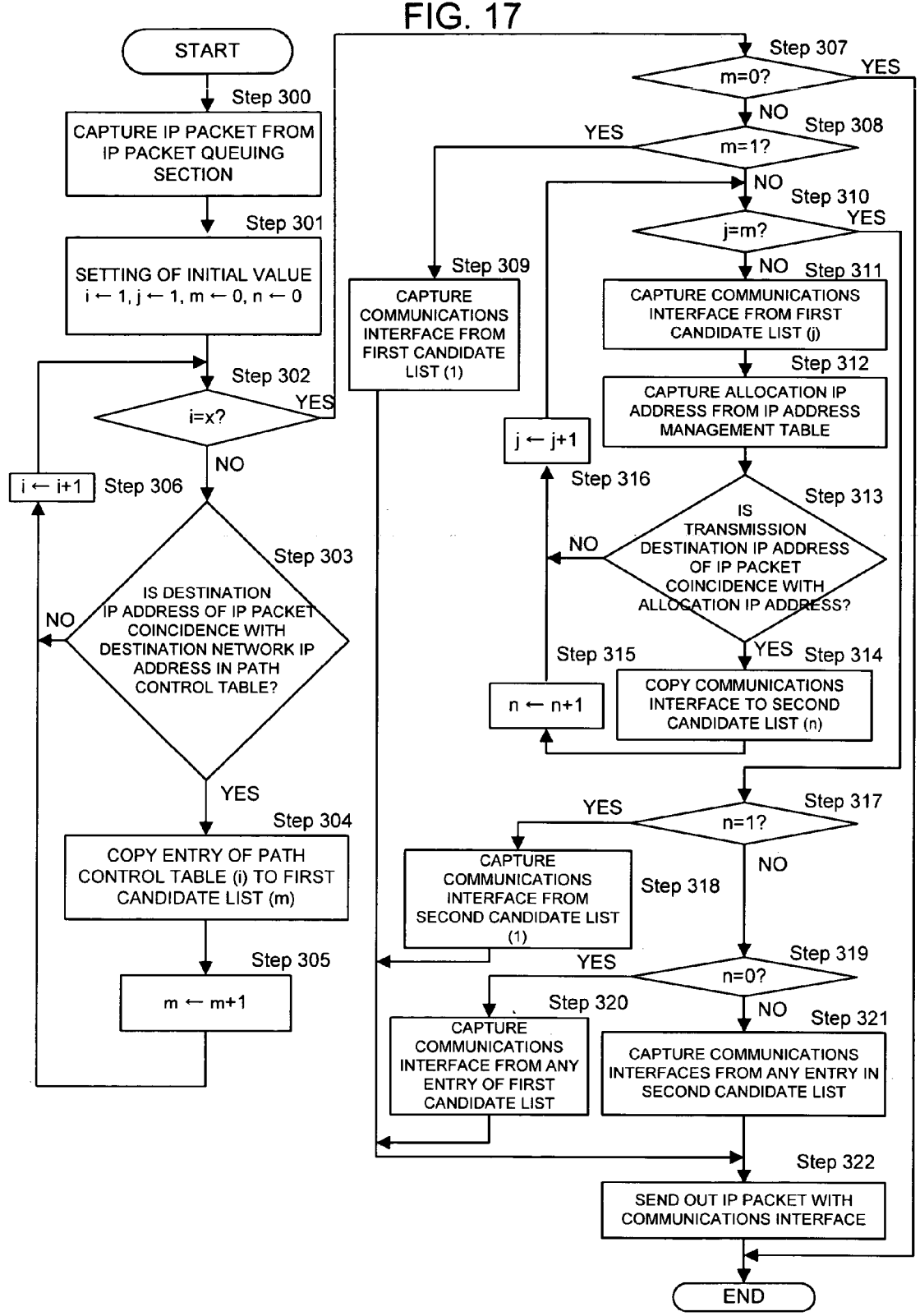
FIG. 17 is a flowchart for transmission IF decision of the transmission IF decision/delivery processor 1320.

FIG. 17 is a flowchart showing the flow of transmission IF decision of the transmission IF decision/delivery processor 1320 in the present embodiment. When the path control table 1321 is constructed with entries of x, the transmission IF decision/delivery processor 1320 prepares as variables a count value i, a first candidate list, a count value m, a count value j, and a second candidate list, and a count value n. The count value i represents an entry in the path control table 1321 processed when a retrieval process is performed under the first condition. The first candidate list stores an arrangement of entries in the path control table selected as a transmission candidate under the first condition. The count value m represents the number of entries stored in the first candidate list. The count value j represents an entry in the first candidate list processed when a selection process is performed under the second condition. The second candidate list stores an arrangement of transmissions interfaces selected as a transmission candidate under the second condition. The counter value n represents the number of entries stored to the second candidate list. First, the transmission IP packet 1610 is derived from the IP packet queuing section 1317 (step 300). "1" is set to the count values i and j as an initial value and "0" is set to the count values m and n (step 301). Then the flow goes to the step 302.

Next, by comparing the count value i with the count value x, it is decided whether or not the first candidate retrieval has been completed (step 302). Specifically, when the count value i is equal to the count value x, the first candidate retrieval has completed. When the count value i is not equal to the count value x (NO in step 302), the value stored in the destination IP address of the transmission IP packet 1610 is compared with the value stored in the destination network IP address of the i-th entry of the path control table (step 303). When the comparison result indicates a match (YES in step 303), the content of the i-th entry of the path control table is copied to the m-th entry of the first candidate list (step 304). Thus, the count value m increments by one (step 305) and the count value i increments by one (step 306). The flow goes to the next path control table entry process. When the value stored in the destination IP address of the transmission IP packet 1610 does not match the value stored in the destination network IP address of the i-th entry of the path control table (NO in step 303), the flow goes to the step 306 without any change.

By repeating the process between the step 302 and the step 306, the process is performed to respective entries sequentially from the first entry of the path control table. When the process reaches the last entry (YES in step 302), the flow goes to the step 307 to decide whether or not entries exist in the first candidate list.

Specifically, the presence or absence of the first candidate is determined by the count value m. When the count value m is "0" (YES in step 307), the communications interface for transmitting the transmission IP packet 1610 doe not exist, so that the process ends. When the count value m is not "0" (NO step 307), the first candidate exists, so that the process goes to the step 308. Next, whether or not the count value m is "1" is determined (step 308). When the count value m is "1" (YES in step 308), the communications interface for transmitting the transmission IP packet 1610 is uniquely determined. Hence, the communications interface recorded to the first entry in the first candidate list is captured (step 309). The transmission IP packet 1610 is transmitted using the captured communications interface (step 322) and thus the process ends. When the count value m is not "1" (NO in step 308), the communications interface used to transmit the transmission IP packet 1610 cannot be determined uniquely, so that the flow goes to the step 310.

In the step 310, it is decided whether or not the second candidate retrieval has completed. Specifically, when the count value j is equal to the count value m, the second candidate retrieval has completed. When the count value j is not equal to the count value m (NO in step), the communications interface of the j-th entry in the first candidate list is first captured (step 311). Next, the allocation IP address corresponding to the communications interface captured in the step 310 is acquired from the IF address management table 1322 (step 312). In succession, the transmission source IP address of the transmission IP packet 1610 is compared with the allocation IP address captured in the step 311 (step 313). When the transmission source IP address of the transmission IP packet 1610 is matched with the allocation IP address (YES in step 313), the communications interface captured in the step 311 is copied to the n-th entry in the second candidate list (step 314). Thus, the count value n increments by one (step 315). Moreover, the count value j increases by one (step 316). The flow goes to the process of the next entry in the first candidate list. When the transmission source IP address of the transmission IP packet 1610 is not matched with the allocation IP address (NO in step 313), the flow goes to the step 316 without any change.

By repeating the process between the steps 310 and 316, each entry process is performed sequentially from the first entry in the first candidate list. When the process reaches the final entry (YES in step 310), the flow goes to the step 317 to determine whether or not entries exist in the second candidate.

Specifically, the existence or absence of the second candidate is determined by the count value n. The count value (n=) "0" means that the communications interface capable of transmitting the transmission IP packet 1610 to the first candidate list exists but is not decided uniquely. The count value (n=) "1" means that the communications interface capable of transmitting the transmission IP packet 1610 is uniquely decided. The count value (n=) "2" or more means that the communications interface capable of transmitting the transmission IP packet 1610 to the second candidate list exists but is not uniquely decided.

When the count value n is "1" (YES in step 317), the communications interface is captured from the first entry in the second candidate list (step 318). Using the captured communications interface (step 322), the transmission IP packet 1610 is transmitted and the process ends. When the count value n is not "1" (NO in step 317), the flow goes to the step 319.

Next, when the count value n is "0" (YES in step 319), the transmission interface is captured from a given entry in the first candidate list (step 320). Using the captured transmission interface, the transmission IP packet 1610 is transmitted (step 322) and the process ends. When the count value n is not "0" (NO in step 319), the transmission interface is captured from a given entry in the second candidate list (step 321). Using the captured transmission interface, the transmission IP packet 1610 is transmitted (step 322) and the process ends.

In the IP header of the transmission IP packet 1610, [200.7.8.9] is stored to the destination IP address and [110.1.2.3] is stored in the transmission source IP address. Therefore, the first candidates correspond to the entries 1321-a, 1321-b and 1321-c in the path control table 1321, shown in FIG. 21. In the execution of the process in the step 307, the first entry of the first candidate list stores the content of the entry 1321-a of the path control table 1321. Moreover, the second entry of the first candidate list stores the content of the entry 1321-b of the path control table 1321. The third entry of the first candidate list stores the content of the entry 1321-c of the path control table 1321. "3" is stored for the count value m. In the step 312, for j=1, [100.1.2.3] is captured as an allocation IP address and for j=2, [110.1.2.3] is captured as an allocation IP address and for j=3, [120.1.2.3] is captured as an allocation IP address. In the execution of the step 317, the second candidate list stores "S-IF#2 only as a transmission interface. "1" is stored as the count value. That is, based on the decision result by the process of the step 317, the process of the step 318 is executed. In the step 318, "S-IF#2 is captured as a transmission interface. The transmission IF decision/delivery processor 1320 transmits the transmission IP packet 1610, using the communications interface S-IF#2 1310-2 corresponding to the path of the path number 3 selected by the scheduler 313-2.

As a result, the transmission IP packet 1610 is transmitted from the communications interface S-IF#2 1310-2. The communications interface R-IF 1500-1 in the reception node 101-2 receives the transmission IP packet 1610 via the carrier network GW 1400-3.

The present embodiment includes plural communications interfaces, in which the transmission node 100-2 and the reception node 101-2 are not in a one-to-one correspondence, each communications interface being allocated with an individual IP address. By implementing the above-mentioned procedure, even such a configuration can transmit the IP packet using the path decided by the scheduler 313-2. The IP packet, which does not particularly store a transmission source IP address and wants the IP routing in the conventional art, can be subjected to the IP routing process.

Figure 18:
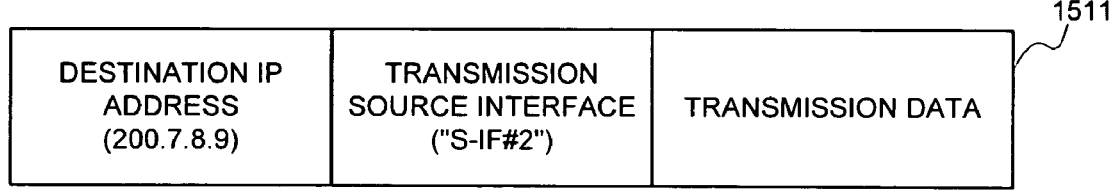
FIG. 18 is a diagram illustrating other transmission IP packet creation data.

Moreover, according to another embodiment, the scheduler 313-2 in the transmission node 100-2 may select a communication path of the communication path number "3" and then converts the transmission IP packet creation data handed over to the IP packet creator 1316 into the format shown in FIG. 18.

FIG. 18 shows the transmission IP packet creation data 1511 in the present embodiment. The scheduler 313-2 stores, as "destination IP address" of the transmission IP packet creation data 1511, the IP address [200.7.8.9] of the communications interface 1500-1 in the reception node 101-2. Moreover, the scheduler 313-2 stores, as "transmission source interface" of the transmission IP packet creation data 1510, the communications interface "S-IF#2" corresponding to the communication path number "3" captured from the path to communications interface correspondence table 1330.

Figure 19:
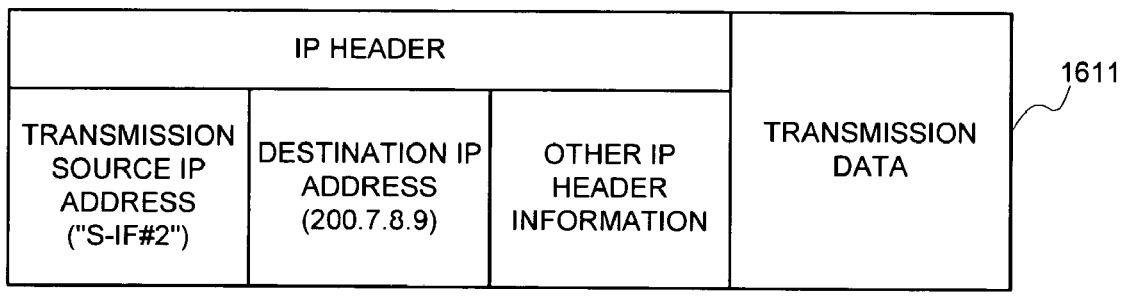
FIG. 19 is a diagram illustrating other delivery IP packet.

When receiving the transmission IP packet creation data 1511, the IP packet creator 1316 creates the transmission IP packet 1611 shown in FIG. 19 and adds it to the IP packet queuing section 1317. In the transmission IP packet 1611, the communications interface "S-IF#2" is stored in the "transmission source IP address" field of the IP header, based on the information contained in the transmission IP packet creation data 1511. Moreover, the IP address [200.7.8.9] of the communications interface R-IF 1500-1 in the reception node 101-2 is stored in the "destination IP address" field of the IP header.

In the IP routing processor 1318, the transmission IF decision/delivery processor 1320 captures the transmission IP packet 1611 from the IP packet queuing section 1317 and decides the communications interface handing over the transmission IP packet, using the path control table 1321 and the IF address management table 1322. Thus, the transmission process is executed.

Figure 20:
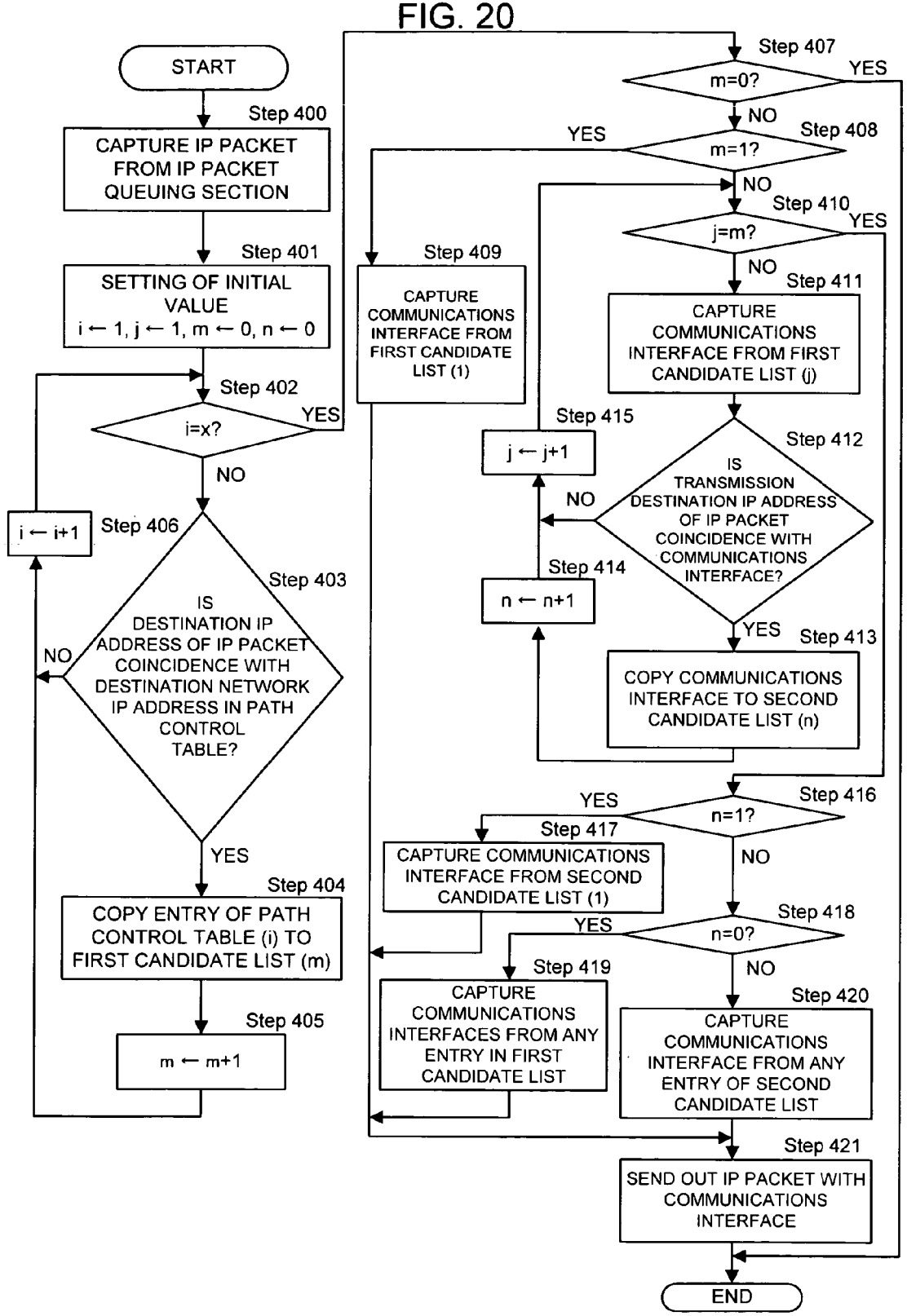
FIG. 20 is a flowchart for other transmission IF decision of the transmission IF decision/delivery processor 1320.

FIG. 20 is flowchart showing the transmission IF decision of the transmission IF decision/deliver processor 1320 in the present embodiment. In this embodiment, when the path control table 1321 is constructed with entries of x, the transmission IF decision/delivery processor 1320 prepares as variables a count value i, a first candidate list, a count value m, a count value j, a second candidate list, and a count value n. The count value i represents an entry in the path control table 1321 to be subjected when a retrieval process is performed under the first condition. The first candidate list stores an arrangement of entries in the path control table selected as a transmission candidate under the first condition. The count value m represents the number of entries stored in the first candidate list. The count value j represents an entry in the first candidate list to be subjected when a selection process is performed under the second condition. The second candidate list stores an arrangement of transmissions interfaces selected as transmission candidates under the second condition. The counter value n represents the number of entries stored to the second candidate list. First, the transmission IP packet 1611 is derived from the IP packet queuing section 1317 (step 400). "1" is set as an initial value to the count value i,j and "0" is set as an initial value to the count value m,n (step 401). Then, the flow goes to the step 402.

Next, the count values i and x are compared and it is decided whether or not the first candidate retrieval has been completed (step 402). Specifically, when the count values i is equal to the count value x, the first candidate retrieval is completed. When the count values i is not equal to the count value x (NO in step 402), the value stored in the destination IP address of the transmission IP packet 1611 is compared with the value stored in the destination network IP address of the i-th entry in the path control table (step 403). When the comparison result provides a match (YES in step 403), the content of the i-th entry in the path control table is copied to the m-th entry of the first candidate list (step 404). Thus, the count value m increments by 1 (step 405). Moreover, when the count value i increments by 1 (step 406), the flow goes to the next path control table entry process. When the value stored in the destination IP address of the transmission IP packet 1611 does not mach the value stored in the destination network IP address of the i-th entry in the path control table (NO in step 403), the flow goes to the step 406, without any change.

By repeating the process between the steps 402 and 406, each entry is processed sequentially from the first entry in the path control table. When the process reaches the last entry (YES in step 402), the flow goes to the step 407 to decide whether of not the entry exists in the first candidate list.

Specifically, the existence or presence of the first candidate is determined by the count value m. When the count value m is "0" (YES in step 407), the process ends because no communications interface exists to transmit the transmission IP packet 1611. When the count value m is not "0" (NO in step 407), the first candidate exists and the flow goes to the step 408. Next, it is decided whether or not the count value m is "1" (step 408). When the count value m is "1" (YES in step 408), the communications interface for transmitting the transmission IP packet 1611 is uniquely decided. For that reason, the communications interface recorded in the first entry of the first candidate list is captured (step 409) and the transmission IP packet 1611 is transmitted using the captured communications interface (step 422). Thus, the process ends. When the count value m is not "1" (NO in step 408), the flow goes to the step 410 because the communications interface used for transmission of the transmission IP packet 1611 cannot be decided uniquely. Thus, the flow goes to the step 410.

It is decide whether or not the second candidate retrieval has completed in the step 410. Specifically, when the count value j is equal to the count value m, the second candidate retrieval has completed. When the count value j is not equal to the count value m (NO in step), the communications interface of the j-th entry in the first candidate list is first captured (step 411). Next, the communications interface stored in the transmission source IP address of the transmission IP packet 1611 is compared with the communications interface captured in the step 411 (step 412). When there is a match (YES in step 412), the communications interface captured in the step 411 is copied to the n-th entry in the second candidate list (step 413). Thus, the count value n increments by one (step 414). Moreover, the count value j increments by one (step 415). Thus, the flow goes to the process of the next entry in the first candidate list. When the interface stored in the transmission source IP address of the transmission IP packet 1611 does not match the communications interface captured in the step 411 (NO in step 412), the flow goes to the step 415 without any change.

By repeating the process between the steps 410 and 415, each entry is processed sequentially from the first entry in the first candidate list. When the process reaches the last entry (YES in step 410), the flow goes to the step 417 to decide the existence or presence of an entry in the second candidate list.

Specifically, the existence or presence of the second candidate list is decided by the count value n. The count value (n=) "0" means that the communications interface, which can transmit the transmission IP packet 1611 to the first candidate list, exists but is not in the status uniquely decided. The count value (n=) "1" means that the communications interface, which can transmit the transmission IP packet 1611, is uniquely decided. The count value (n=) "2" or more means that the communications interface, which can transmit the transmission IP packet 1611 to the second candidate list, exists but is not in the status uniquely decided.

When the count value n is "1" (YES in step 416), the communications interface is captured from the first entry in the second candidate list (step 417). The transmission IP packet 1611 is transmitted using the captured communications interface (step 421) and thus the process ends. When the count value n is not "1" (NO in step 416), the flow goes to the step 419.

Next, when the count value n is "0" (YES in step 418), the transmission interface is captured from a given entry in the first candidate list (step 419). The transmission IP packet 1611 is transmitted using the captured transmission interface (step 421) and thus the process ends. When the count value n is not "0" (NO in step 418), the transmission interface is captured from a given entry in the second candidate list (step 420). The transmission IP packet 1611 is transmitted using the captured communications interface (step 421) and thus the process ends.

In the IP header of the transmission IP packet 1611, the destination IP address stores [200.7.8.9] and the transmission source IP address actually stores an identifier "S-IF#2" (not an IP address). In the path control table 1321, the entries 1321-*a*, 1321-*b*, and 1321-*c* correspond to the first candidate. In the execution of the process in the step 407, the first entry in the first candidate list stores the content of the entry 1321-*a* in the path control table 1321. The second entry in the first candidate list stores the content of the entry 1321-*b* in the path control table 1321. The third entry in the first candidate list stores the content of the entry 1321-*c* in the path control table 1321. "3" is stored as the count value m. In the execution of the process in the step 416, the second candidate list stores "S-IF#2" only as a transmission interface and stores "1" as the count value. That is, the process of the step 418 is executed based on the decision result by the process in the step 417. In the step 418, "S-IF#2" is captured as the transmission interface. The transmission IF decision/delivery processor 1320 transmits the transmission IP packet 1611, using the communications interface S-IF#2 1310-2 corresponding to the path of a path number 3 selected by the scheduler 313-2.

As a result, the communications interface S-IF#2 1310-2 transmits the transmission IP packet 1611 and the communications interface R-IF 1500-1 in the reception node 101-2 receives the IP packet 1611 via the carrier network GW 1400-3

In the above-mentioned procedure, the present embodiment includes plural communications interfaces in which the transmission node 100-2 and the reception node 101-2 do not correspond to each other one to one. In the IP network configuration in which an individual IP address is allocated to each communications interface, IP packets can be transmitted using the path decided by the scheduler 313-2.

The IP routing process can be performed to IP packets, which do not particularly specify a communications interface but want the IP routing in the conventional art, not specified by the communications interface.

In the transmission node of the above-mentioned embodiment, the queuing section, the scheduler, and the path status monitor are constructed respectively. However, all or part of those elements may be constructed using the CPU that operate under the control program.

The invention claimed is:

1. A load distributing method comprising the steps of:
    affixing packet identification information for identifying packets to a transmitted packet, transmitting said transmitted packet, and storing a transmission history of said transmitted packets and packet identification information at a transmission node;
    transmitting path status information including a path status and the packet identification information of the last packet received in said path status from a reception node to the transmission node;
    estimating an arrival time of the packet that is to be transmitted, based on said path status of the path status information and the transmission history of the packets transmitted after transmission of the packet specified with said packet identification information of the path status information at the transmission node; and
    updating path selection or selection priority, based on said estimated arrival prediction time, at the transmission node.

2. The load distributing method defined in claim 1, wherein said path status information includes a delay of a path.

3. The load distributing method defined in claim 1, wherein said path status information includes a transmission rate of a path.

4. The load distributing method defined in claim 1, wherein said path status information includes a load of a path.

5. The load distributing method defined in claim 1, further comprising the step of correcting a transmission cost calculation result regarding a packet transmitted before updating path status information of each path, when the path status information is updated for said path selection or for said selection priority update.

6. The load distributing method defined in claim 5, further comprising the step of discarding a history prior to a first packet transmitted on or after a time from which latest path status information is effective, when a transmission cost calculation result of each path is corrected.

7. The load distributing method defined in claim 1, further comprising the step of selecting as a packet transmission path a path having an earliest estimation value of a reception completion time at a reception node.

8. The load distributing method defined in claim 1 further comprising the step of selecting as a packet transmission path a path having a largest estimation value of a data amount, which can be completely received by a specific time at a reception node.

9. The load distributing method defined in claim 1, further interrupting data transmission according to an estimated current path status in each path.

10. The load distributing method defined in claim 9, wherein a condition for interruption of said data transmission is that an estimated reception completion time is equal to or greater than a specific value.

11. The load distributing method defined in claim 1, wherein path selection or transmission interruption is determined according to a policy different for each attribute of transmission data.

12. A node capable of selecting plural packet transmission paths, comprising:
    transmitting means for affixing packet identification information for identifying packets to a transmitted packet and transmitting said transmitted packet;
    memory means for storing a transmission history of said transmitted packets and said packet identification information;
    receiving means for receiving path status information including the packet identification information of the last packet received in a path status from other nodes; and
    scheduling means for estimating an arrival time of the packet that is to be transmitted, based on said path status information, and the transmission history of the packets transmitted after transmission of the packet specified with the packet identification information of the last packet received in said path status, which is included in said path status information, and updating path selection or selection priority, based on said estimated arrival prediction time.

13. The node defined in claim 12, wherein said path status information includes a delay of a path.

14. The node defined in claim 12, wherein said path status information includes a transmission rate of a path.

15. The node defined in claim 12, wherein said path status information includes a load of a path.

16. The node defined in claim 12, wherein said scheduling means corrects a transmission cost calculation result regarding a packet transmitted prior or updating when path status information of each path is updated in the updating of said path selection or said selection priority.

17. The node defined in claim 16, wherein said scheduling means discards a history before a first transmitted packet validating latest path status information when a transmission cost calculation result of each path is corrected.

18. The node defined in claim 12, wherein said scheduling means selects as a packet transmission path a path having an earliest estimation value of a reception completion time at a reception node.

19. The node defined in claim 12, wherein said scheduling means selects as a packet transmission path a path having a largest estimation value of a data amount which can be completely received by a specific time at a reception node.

20. The node defined in claim 12, wherein said scheduling means interrupts data transmission according to an estimated current path status for each path.

21. The node defined in claim 20, wherein a condition for interruption of said data transmission is that an estimated reception completion time is equal to or greater than a specific value.

22. The node defined in claim 12, wherein said scheduling means determines the interruption of path selection or transmission according to a policy different every attribute of a transmission data.

23. The node defined in claim 12, further comprising:
a table in which an address of a communications interface is associated with a destination address reachable using said communications interface; and
routing means for selecting a communications interface corresponding to a destination address of a packet to be transmitted, from said table, selecting a communications interface corresponding to a transmission source address or a communication interface from said selected communications interface when said transmission packet has a information specifying the transmission source address or a communications interface, and sending said transmission packet to a selected communications interface.

24. A non-transitory computer-readable medium storing a node control program, which is applicable to a processor-controlled node that can select plural packet transmission paths, said node control program controlling the node to:
affix packet identification information for identifying packets to a transmitted packet, transmit said transmitted packet, and store a transmission history of said transmitted packets and packet identification information at a transmission node;
transmit path status information including a path status and the packet identification information of the last packet received in said path status from a reception node to the transmission node;
estimate an arrival time of the packet that is to be transmitted, based on said path status of the path status information and the transmission history of the packets transmitted after transmission of the packet specified with said packet identification information of the path status information, at the transmission node; and
update path selection or selection priority, based on said estimated arrival prediction time, at the transmission node.

25. The non-transitory computer-readable medium defined in claim 24 wherein said path status information includes a delay of a path.

26. The non-transitory computer-readable medium defined in claim 24, wherein said path status information includes a transmission rate of a path.

27. The non-transitory computer-readable medium defined in claim 24, wherein said path status information includes a load of a path.

28. The non-transitory computer-readable medium defined in claim 24, said node control program further controlling said node to correct a transmission cost calculation result regarding a packet transmitted prior or updating when path status information of each path is updated in the updating of said path selection or said selection priority.

29. The non-transitory computer-readable medium defined in claim 28, said node control program further controlling said node to discard a history before a first transmitted packet validating latest path status information when a transmission cost calculation result of each path is corrected.

30. The non-transitory computer-readable medium defined in claim 24, said node control program further controlling said node to select as a packet transmission path a path having an earliest estimation value of a reception completion time at a reception node.

31. The non-transitory computer-readable medium defined in claim 24, said node control program further controlling said node to select as a packet transmission path a path having a largest estimation value of a data amount which can be completely received by a specific time at a reception node.

32. The non-transitory computer-readable medium defined in claim 24, said node control program further controlling said node to interrupt data transmission according to an estimated current path status for each path.

33. The non-transitory computer-readable medium defined in claim 32, wherein a condition for interruption of said data transmission is that an estimated reception completion time is equal to or greater than a specific value.

34. The non-transitory computer-readable medium defined in claim 24, said node control program further controlling said node to determine path selection or transmission interruption according to a policy different every attribute of transmission data.

35. The non-transitory computer-readable medium defined in claim 24, said node control program further causing said node to operate as routing means that:
selects a communications interface corresponding to a destination address of a packet to be transmitted, from a table in which an address of a communications interface is associated with a destination address reachable using said communications interface,
selects a communications interface corresponding to said a transmission source address or a communications interface, from said selected communications interface when said transmission packet has information specifying a transmission source address or a communications interface, and
transmits said packet to be transmitted, to say selected communications interface.

\* \* \* \* \*